(12) United States Patent
Taniguchi et al.

(10) Patent No.: US 7,783,419 B2
(45) Date of Patent: Aug. 24, 2010

(54) CONTENT DISPLAY DEVICE AND CONTENT DISPLAY METHOD

(75) Inventors: Koji Taniguchi, Osaka (JP); Shigemitsu Watanabe, Tokyo (JP); Takao Yamaguchi, Osaka (JP); Junichi Sato, Tokyo (JP); Ichiro Takei, Tokyo (JP)

(73) Assignee: Panasonic Corporation, Osaka (JP)

(*) Notice: Subject to any disclaimer, the term of this patent is extended or adjusted under 35 U.S.C. 154(b) by 903 days.

(21) Appl. No.: 11/569,888

(22) PCT Filed: Jun. 3, 2005

(86) PCT No.: PCT/JP2005/010267
§ 371 (c)(1),
(2), (4) Date: Dec. 1, 2006

(87) PCT Pub. No.: WO2005/122012
PCT Pub. Date: Dec. 22, 2005

(65) Prior Publication Data
US 2009/0177381 A1   Jul. 9, 2009

(30) Foreign Application Priority Data
Jun. 7, 2004   (JP)   ............... 2004-168209
Jun. 2, 2005   (JP)   ............... 2005-163088

(51) Int. Cl.
*G01C 21/30* (2006.01)
(52) U.S. Cl. ..................... 701/208; 701/207
(58) Field of Classification Search .......... 701/207, 701/208; 707/3
See application file for complete search history.

(56) References Cited

U.S. PATENT DOCUMENTS

| 6,542,814 | B2 * | 4/2003 | Polidi et al. | 701/208 |
| 6,542,822 | B1 * | 4/2003 | Froeberg | 701/213 |
| 6,760,770 | B1   | 7/2004 | Kageyama | |
| 7,082,365 | B2 * | 7/2006 | Sheha et al. | 701/209 |
| 7,239,963 | B2 * | 7/2007 | Suzuki | 701/211 |

(Continued)

FOREIGN PATENT DOCUMENTS

JP   10-89976   4/1998

(Continued)

OTHER PUBLICATIONS

English language Abstract of JP 10-89976.

(Continued)

*Primary Examiner*—Mark Hellner
*Assistant Examiner*—Helal A Algahaim
(74) *Attorney, Agent, or Firm*—Greenblum & Bernstein, P.L.C.

(57) ABSTRACT

A meta data set correlated with position information is acquired from a server via a communication interface unit (202) or a broadcast interface unit (201). A current position information acquisition unit (208) acquires the current position information and a content processing unit (203) outputs a content list matched with the search condition including the current position information from the meta data set. When a display list is generated according to the content list, a content display control unit (204) compares the content list to the display list. When they coincide, the meta data generates a display list without changing the display method and displays the search result on a browser unit (205) according to the display list generated by the content display control unit (204).

20 Claims, 20 Drawing Sheets

U.S. PATENT DOCUMENTS

| | | | |
|---|---|---|---|
| 7,373,336 B2* | 5/2008 | Jasinschi et al. | 1/1 |
| 7,461,528 B2* | 12/2008 | Taniguchi et al. | 70/207 |
| 7,589,628 B1* | 9/2009 | Brady, Jr. | 340/539.11 |
| 7,620,404 B2* | 11/2009 | Chesnais et al. | 455/456.1 |
| 2002/0065068 A1 | 5/2002 | Nobukiyo | |
| 2002/0087266 A1* | 7/2002 | Sugimoto et al. | 701/207 |
| 2003/0201914 A1 | 10/2003 | Fujiwara et al. | |
| 2004/0003097 A1* | 1/2004 | Willis et al. | 709/228 |
| 2004/0012506 A1* | 1/2004 | Fujiwara et al. | 340/995.1 |
| 2004/0068552 A1* | 4/2004 | Kotz et al. | 709/218 |
| 2004/0078813 A1* | 4/2004 | Kobuya et al. | 725/46 |
| 2005/0177303 A1* | 8/2005 | Han | 701/209 |
| 2005/0203698 A1* | 9/2005 | Lee | 701/200 |
| 2006/0041556 A1 | 2/2006 | Taniguchi et al. | |
| 2006/0229807 A1* | 10/2006 | Sheha et al. | 701/209 |
| 2007/0038950 A1 | 2/2007 | Taniguchi et al. | |
| 2008/0214152 A1* | 9/2008 | Ramer et al. | 455/414.1 |
| 2008/0214156 A1* | 9/2008 | Ramer et al. | 455/414.1 |
| 2009/0177381 A1* | 7/2009 | Taniguchi et al. | 701/208 |
| 2009/0213232 A1* | 8/2009 | Asakura et al. | 348/208.4 |

FOREIGN PATENT DOCUMENTS

| | | |
|---|---|---|
| JP | 10-103977 | 4/1998 |
| JP | 2001-134618 | 5/2001 |
| JP | 2001-174273 | 6/2001 |
| JP | 2002-163267 | 6/2002 |
| JP | 2002-208019 | 7/2002 |
| JP | 2004-94397 | 3/2004 |
| WO | 02/065331 | 8/2002 |
| WO | 2004/021218 | 3/2004 |

OTHER PUBLICATIONS

English language Abstract of JP 2002-208019.

* cited by examiner

```
<ci:ContentInfo>                                                    501

<ci:Language> Japanese </ci:Language>                           502

<ci:Title> Italian cuisine ○○ </ci:Title>
    <ci:Category> Restaurant </ci:Category>                         503
    <ci:Keyword> Restaurant, Italian cuisine, pasta</ci:Keyword>

<ci:Date>
        <ci:DateFrom> 1995/01/01 </ci:DateFrom>
        <ci:DateTo> non </ci:DateTo>                                504
        <ci:Update> 2002/12/01 </ci:Update>
    <ci:Date>

<ci:Location>

<ci:Coordinate> N. xx. xx. xx Exx. xx. xx <ci:/Coordinate>

<ci:Address country="Japan">
            <ci:AddressLine type="Prefecture"> ○○ Prefecture </ci:AddressLine>
            <ci:AddressLine type="City"> △△ City </ci:AddressLine>   505
            <ci:AddressLine type="town"> □□ Street </ci:AddressLine>
            <ci:AddressLine type="number">Street number xxxx</ci:AddressLine>
            <ci:AddressLine type="ext"> ○○ Bldg. 1F </ci:AddressLine>
        <ci:Address>

<ci:ZipCode>xxx-xxxx</ci:ZipCode>

</ci:Location>

<ci:ContactAddress>
        <ci:Phone>+81-x-xxxx-xxxx</ci:Phone>                        506
        <ci:Email>xxx@xxx. xxx. com</ci:Email>
    </ci:ContactAddress>

<ci:Reference> http://xxx. xxx. com/index. html <ci:/Reference>  507

<ci:Abstract>
        <!-- Summary introduction text for restaurant-->             508
    </ci:Abstract>

</ci:ContentInfo>                                                    509
```

```
<ci:ContentInfo>
    <ci:Title> Italian cuisine ○○ </ci:Title>
    <ci:Category> Restaurant </ci:Category>
    <ci:Coordinate> Nxx.xx.xx.xx Exx.xx.xx.xx </ci:Coordinate>
    <ci:Reference> http:// xxx.xxx.com/index.html </ci:Reference>
    <ci:Metadata> http:// xxx.xxx.com/metadata.xml </ci:Metadata>
</ci:ContentInfo>
```
~600

FIG. 6

```
<ListContent>                                                              ~701
    <MeshArea lat="xx. xx. xx" lon="xx. xx. xx" size="500">
        <ContentInfo>       </ContentInfo>                                 ~704
        <ContentInfo>       </ContentInfo>
        <ContentInfo>       </ContentInfo>                                 ~703a
        <ContentInfo>       </ContentInfo>
        <ContentInfo>       </ContentInfo>
        :
    </MeshArea>

<MeshArea lat="xx. xx. xx" lon="xx. xx. xx" size="500">
        <ContentInfo>       </ContentInfo>
        <ContentInfo>       </ContentInfo>
        <ContentInfo>       </ContentInfo>                                 ~703b
        <ContentInfo>       </ContentInfo>
        <ContentInfo>       </ContentInfo>
        :
    </MeshArea>

<MeshArea lat="xx. xx. xx" lon="xx. xx. xx" size="500">
        <ContentInfo>       </ContentInfo>
        <ContentInfo>       </ContentInfo>
        <ContentInfo>       </ContentInfo>                                 ~703c
        <ContentInfo>       </ContentInfo>
        <ContentInfo>       </ContentInfo>
        :
    </MeshArea>
    :
</ListContent>                                                             ~702
```
700

FIG. 7

```
<ci:ContentInfo>
    <ci:Title> Store C2 </ci:Title>
    <ci:Category> Convenience store </ci:Category>
    <ci:Metadata> http://www.xxx/02_metadata.xml </ci:Metadata>
    <ci:Reference> http//www.xxx/C2_content.html </ci:Reference>
</ci:ContentInfo>

<ci:ContentInfo>
    <ci:Title> Store C5 </ci:Title>
    <ci:Category> Supermarket </ci:Category>
    <ciMetadata> http://www.xxx/05_metadata.xml </ci:Metadata>
    <ci:Reference> http//www.xxx/C5_content.html </ci:Reference>
</ci:ContentInfo>
```

CONTENT DISPLAY DEVICE AND CONTENT DISPLAY METHOD

TECHNICAL FIELD

The present invention relates to a content display apparatus that displays information relating to content linked to a geographical location.

BACKGROUND ART

With the increasing popularity of mobile terminals that have a GPS (Global Positioning System) function in recent years, there is a growing demand for location information services that offer information relating to a user's current locality. A known general location information service that has been available for some time is a service whereby location information is reported from a GPS-equipped mobile terminal to a server, information on the current locality of this mobile terminal is retrieved on the server side, and the retrieved results are sent back to the mobile terminal.

The method shown in Patent Document 1 is a conventional example of a current locality information provision method in a content display apparatus that receives and displays a location information service. In this method, when a content search condition is transmitted to an information provision apparatus from a moving content display apparatus, information on content matching the specified search condition is transmitted from the information provision apparatus to the content display apparatus, an icon indicating the content location is displayed on a map shown on the screen of the content display apparatus, and when the user selects the icon on the map, content information is displayed.

Patent Document 2 describes a content display apparatus known as a car navigation apparatus. When deciding on a destination, this content display apparatus searches for facilities in the current locality, for example, displays a list of found facilities on the screen and also performs map scaling computation to allow all the listed facilities to be displayed on the map, and displays marks indicating the locations of the facilities on that scaled-down map.

Patent Document 1: Japanese Patent Application Laid-Open No. HEI 10-89976
Patent Document 2: Japanese Patent Application Laid-Open No. 2002-208019

DISCLOSURE OF INVENTION

Problems to be Solved by the Invention

However, a problem with the content display apparatus of Patent Document 1 is that the visibility of a search result is low when given only by an icon display on a map. Also, with the content display apparatus of Patent Document 2, although a list of found facilities and a map indicating the locations of those facilities are displayed simultaneously, no mention is made of a method of updating search results displayed on the screen when a user searches for current locality information periodically while moving.

With current locality content searching while moving, it is desirable for the list of search results to be updated dynamically so as to be clearly visible to the user.

It is an object of the present invention to provide a content display apparatus and content display method that enable information relating to content located in the current locality of a moving user to be searched for, and, with regard to the search results, enable display of a content list to be updated dynamically so as to be clearly visible to the user.

Means for Solving the Problems

A content display apparatus of the present invention employs a configuration that includes: a metadata acquisition section that acquires a collection of metadata including at least content location information indicating content linked to a geographical location and an identifier identifying a resource of the content; a current location information acquisition section that acquires current location information; a content processing section that outputs as a content list a list of metadata matching a search condition that includes the current location information acquired by the current location information acquisition section from the collection of metadata acquired by the metadata acquisition section; a content display control section that, when generating a display list based on the content list output by the content processing section, compares the content list and the display list, and, for matching metadata, generates the display list without changing a manner of display; and a search results display section that displays search results based on the display list generated by the content display control section.

Advantageous Effect Of The Invention

The present invention enables information relating to content existing in the current locality of a moving user to be searched for, and, with regard to the search results, enables display of a content list to be updated dynamically so as to be clearly visible to the user.

BRIEF DESCRIPTION OF DRAWINGS

FIG. 5 is a drawing showing an example of content information of a content display apparatus according to one embodiment of the present invention;

FIG. 6 is a drawing showing an example of content information of a content display apparatus according to one embodiment of the present invention;

FIG. 7 is a drawing showing an example of list content of a content display apparatus according to one embodiment of the present invention;

FIG. 8 is a drawing showing an example of output content of content search processing of a content display apparatus according to one embodiment of the present invention;

BEST MODE FOR CARRYING OUT THE INVENTION

A content display apparatus according to an embodiment of the present invention will now be described with reference to the accompanying drawings.

Figure 1:
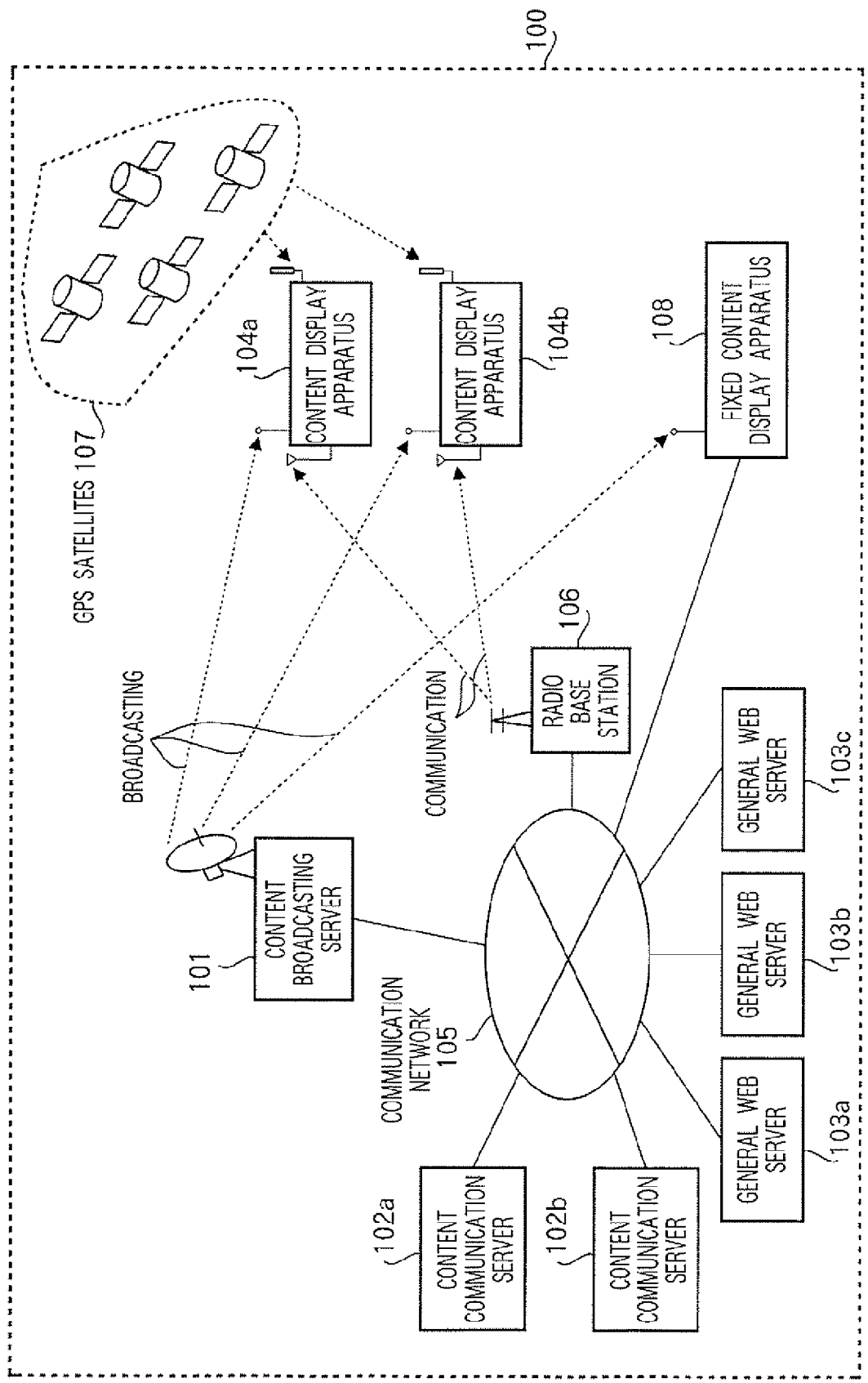
FIG. 1 is a system configuration diagram of a content adaptive distribution system that includes content display apparatuses according to one embodiment of the present invention.

FIG. 1 is a configuration diagram of a content adaptive distribution system that includes content display apparatuses according to one embodiment of the present invention. In content adaptive distribution system 100 according to this embodiment, servers 101, 102a, 102b, and 103a through 103c provide content location information indicating content linked to a geographical location, and wide-area information relating to location-dependent content that is content having location information, which is metadata including at least an identifier identifying a content resource, to content display apparatuses 104a, 104b, and 108 (hereinafter also referred to as "terminals"). In response, terminals 104a, 10b, and 108 perform location-dependent content search and display based on the provided information.

Content adaptive distribution system 100 of this embodiment includes a content broadcasting server 101, content communication servers 102 (102a and 102b), general Web servers 103 (103a through 103c), content display apparatuses 104 (104a and 104b), a communication network 105, a radio base station 106, GPS satellites 107, and a fixed content display apparatus 108.

Content broadcasting server 101 performs general digital broadcasting to terminals that have a broadcast reception function. Content broadcasting server 101 is a broadcasting station that can perform content distribution by means of carousel data broadcasting whereby all pages of data that can be seen at a given time are repeatedly sent periodically. Content broadcasting server 101 is connected to communication network 105.

Content communication servers 102 distribute content to terminals that have a communication function using an Internet protocol. A Web server (HTTP server) on the Internet can be mentioned as a concrete example of a content communication server 102. General Web servers 103 distribute content to terminals using an Internet protocol in the same way as content communication servers 102.

Content display apparatuses 104 are mobile client terminals that have a function for receiving digital broadcasts from content broadcasting server 101, a function for accessing communication network 105 via radio base station 106, and a function for acquiring location information by means of signal reception from GPS satellites and so forth. Content display apparatuses 104 receive content from content broadcasting server 101, content communication servers 102, and general Web servers 103 by means of broadcasting or communication.

A content display apparatus 104 may be any kind of terminal, such as a PDA (Personal Digital Assistant), mobile phone, or car navigation system.

Communication network 105 is a network allowing mutual communication between servers (content broadcasting server 101, content communication servers 102, general Web servers 103) and content display apparatuses 104 via radio base station 106. Communication network 105 may be any kind of network such as the Internet, a WAN (Wide Area Network), a LAN (Local Area Network), a radio network, or a network in which these are combined. Radio base station 106 relays communications between communication network 105 and mobile content display apparatuses 104.

GPS satellites 107 are satellites used for navigation (positioning) by genera aircraft, automobiles, and so forth. A mobile content display apparatus 104 receives radio waves from a plurality of GPS satellites 107, and calculates latitude and longitude coordinate values of the terminal's current location. Fixed content display apparatus 108 is a content display apparatus with a fixed location that displays content from various servers.

Next, data transmitted and received in content adaptive distribution system 100 will be described. Content adaptive distribution system 100 can transmit and receive any general content existing on the Internet, but in particular performs transmission and reception of location-dependent content and content information, and list content. Here, location-dependent content is content containing contents relating to a store, facility, or the like associated with latitude and longitude coordinate values.

Content information is location-dependent content metadata, and includes at least actual content geographical location information and network location information. Here, geographical location information is geographical location information (latitude and longitude coordinates) linked to location-dependent content. Network location information is a URL (Uniform Resource Locator) (or URI (Uniform Resource Identifier)) which is an identifier that identifies a location-dependent content resource.

Other items included in content information are content title or category, text giving an overview, contact address, update date and time, and so forth. Geographical space in which location-dependent content is distributed is divided in a mesh fashion, and list content is data providing content information of location-dependent content contained in each mesh area.

In this embodiment, content broadcasting server 101, or a content communication server 102, distributes list content to a content display apparatus 104, and a general Web server 103 distributes location-dependent content to content display apparatus 104. On the other hand, content display apparatus 104 searches for content information included in a specific geographical area, and presents this to the user by displaying it.

Hereinafter, a specific location included in a location-dependent content distribution region is referred to as a Point Of Interest (POI), and a geographical area restricted to the locality of a PCI is referred to as a Region Of Interest (ROI). In this embodiment, the current location of a content display apparatus 104 is designated a POI, and a circular area centered on a POI is designated a ROI. A ROI need not be restricted to a circular area centered on a POI, but may also be set as an area or any shape related to a POI.

Figure 2:
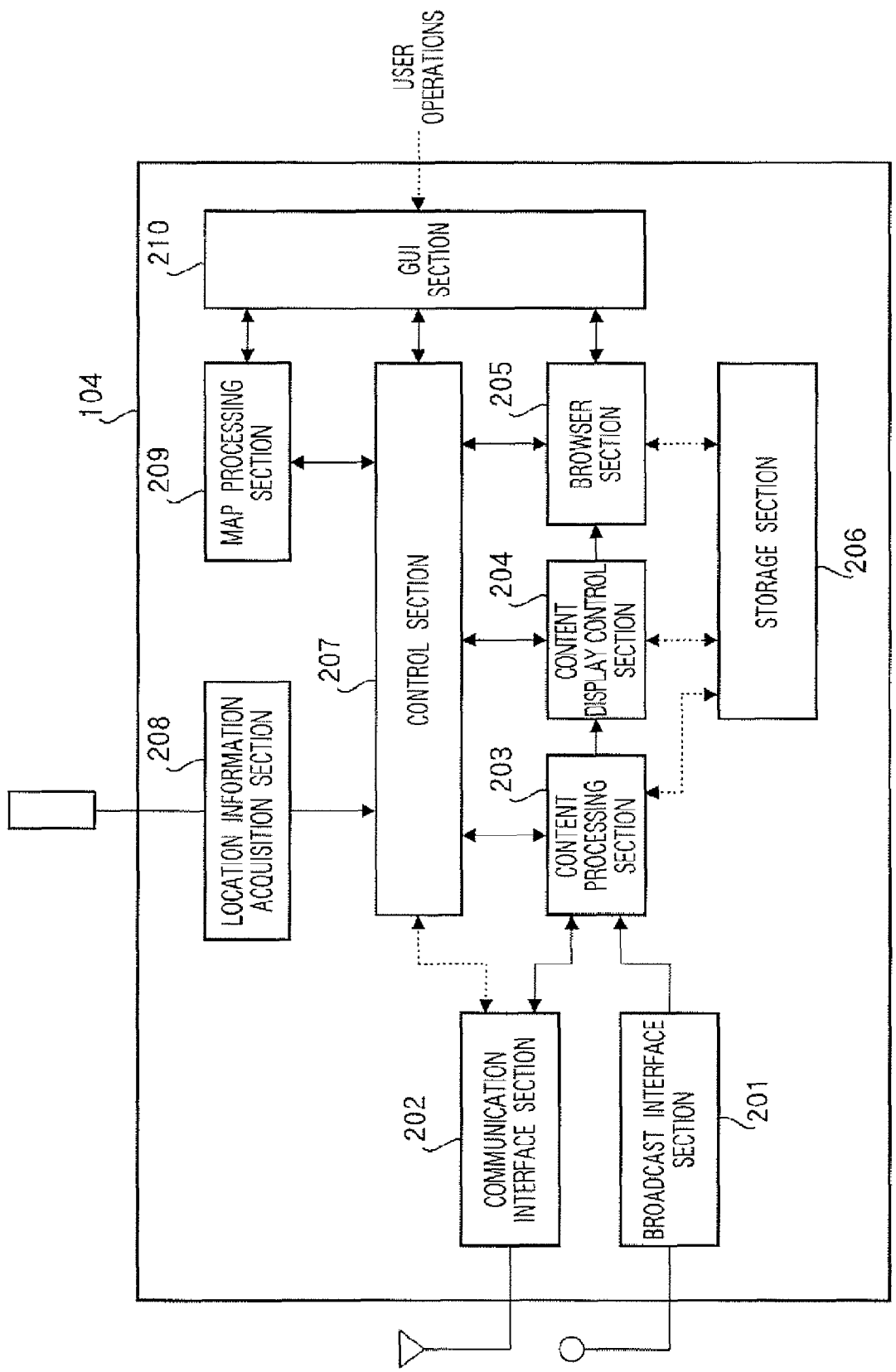
FIG. 2 is a block diagram of a content display apparatus according to one embodiment of the present invention.

Next, a content display apparatus 104 of this embodiment will be described in detail using the block diagram in FIG. 2. Content display apparatus 104 is a client terminal that allows efficient viewing of Web content relating to the current locality of content display apparatus 101 by using location information and list content acquired by means of GPS or the like.

A broadcast interface section 201 is a data receiving section for receiving a terrestrial digital broadcast or the like transmitted from content broadcasting server 101, and can receive list content and other content distributed by means of carousel data broadcasting.

A communication interface section 202 is a data transmitting/receiving section for performing bidirectional communication with any server among content broadcasting server 101, content communication servers 102, and general Web servers 103, via radio base station 106 and communication network 105. In this embodiment, communication interface section 202 is used for acquiring content from a server by means of an Internet protocol, and in particular, HTTP (Hypertext Transfer Protocol).

A content processing section 203 acquires data from broadcast interface section 201 or communication interface section 202 in accordance with an instruction from a control section 207, and executes HTTP proxy processing or content search processing for list content. Data processed in content processing section 203 is output to a content display control section 204.

Content display control section 204 converts data acquired from content processing section 203 to a format that can be displayed by a browser section 205. For example, if browser section 205 is an XHTML (Extensible Hypertext Markup Language) browser, content display control section 204 generates XHTML content using XSLT (Extensible Stylesheet Language Transformations) or the like, and outputs that HTML content to browser section 205.

Browser section 205 is a section for displaying content acquired from content display control section 204, and has functions equivalent to those of a general Web browser (XHTML browser). Browser section 205 outputs a message (HTTP message) relating to content distribution to content processing section 203 via control section 207, and receives HTML content as a response.

When content adaptive distribution system 100 distributes content written in markup languages other than HTML, browser section 205 is assumed to have a function for displaying content written in these markup languages.

A storage section 206 is a data storage section used for temporary storage of content being processed by content processing section 203, and comprises memory or a hard disk. Storage section 206 also has a function of caching content displayed by browser section 205.

Control section 207 performs overall control of content display apparatus 104. The main function of control section 207 is to report location information acquired from a location information acquisition section 208 to content processing section 203. Control section 207 also gives instructions for content acquisition or content display to content processing section 203, content display control section 204, and browser section 205.

Location information acquisition section 208 acquires geographical location information (latitude and longitude coordinate values) by means of GPS or the like, and outputs the acquired location information to control section 207. This location information indicates the current location of content display apparatus 104. Location information output by location information acquisition section 208 is referred to as Point Of Interest location information.

A map processing section 209 has functions possessed by a general map display application, such as map drawing, map display area changing/enlargement/reduction, and map searching, for example. This map processing section 209 is used to display the current location of content display apparatus 104, or for a search for an arbitrary location (for example, a target location) by the user. Map processing section 209 can also output location information for a specific point on a map (=Point Of Interest location information) to control section 207.

A GUI section 210 is a GUI (Graphical User Interface) equipped with a function for acquiring a content viewing, map display, or map search related instruction from the user, functions for selecting content to be received from content broadcasting server 101 (reception channel selection and so forth), a function for specifying the address of content to be acquired from a content communication server 102 or general Web server 103, a function for providing the user with information contained in list content received from content broadcasting server 101, a function for accepting various kinds of information input from the user, and so forth.

An overview will now be given of the services provided to a content display apparatus 104 in content adaptive distribution system 10 of this embodiment.

Figure 3:
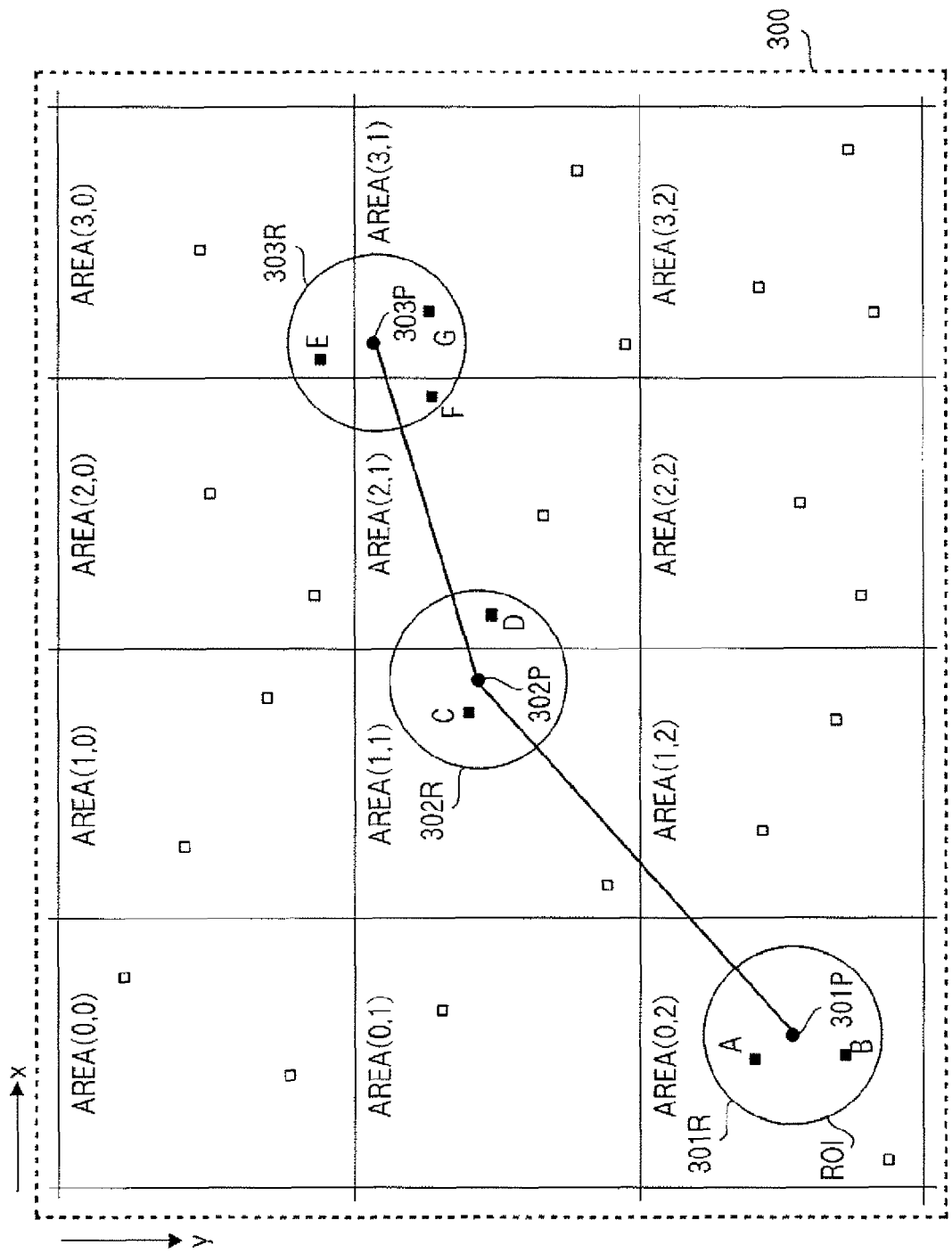
FIG. 3 is a drawing showing the relationship between a content distribution region, mesh areas, and a Region Of Interest (ROI) of a content display apparatus according to one embodiment of the present invention.

FIG. 3 is a drawing showing a geographical space in which location-dependent content is distributed—that is, a content distribution region—for a content display apparatus of this embodiment. Content distribution region 300 in FIG. 3 is divided into rectangular mesh areas with 4 divisions in the x-axis direction and 3 divisions in the y-axis direction. Numbers are assigned starting from 0 in the x-axis direction and y-axis direction in FIG. 3, and each rectangular mesh area is represented by x and y coordinate values. For example, the rectangular mesh area with x coordinate =2 and y coordinate=1 is described as area (2,1).

Stores, facilities, and so forth are distributed within the individual areas. For example, general Web server 103 of store A belonging to area (0,2) in FIG. 3 has location-dependent content containing information relating to the goods handled by that store, Location-dependent content relating to store A has network location information (a URL), and the latitude and longitude coordinate values of the location of store A are associated with (assigned correspondence to) geographical location information.

A general description will now be given of content display by a content display apparatus 104. In FIG. 3, a case is illustrated in which content display apparatus 104 moves from point 301P to point 303P via point 302P, and the user of content display apparatus 104 searches for information relating to his or her current locality while moving. In FIG. 3, each of circular regions 301R, 302R, and 303R set with points 301P, 302P, and 303P as their respective centers is a ROI. This ROI defines the location-dependent content search range.

While following the course shown in FIG. 3, content display apparatus 104 receives list content and searches that list content for location-dependent content included in the ROI with the current location of content display apparatus 134 at its center. For example, when content display apparatus 104 is at point 301P, store A and store B are within Region Of Interest 301R, and content information for store A and store B is output as content search processing results.

When content display apparatus 104 moves to point 302P, the content search results are updated to contain only information on store C and store D. Similarly, when content display apparatus 104 moves to point 303P, content search results are updated to contain only information on store E, store F, and store G.

Figure 4:
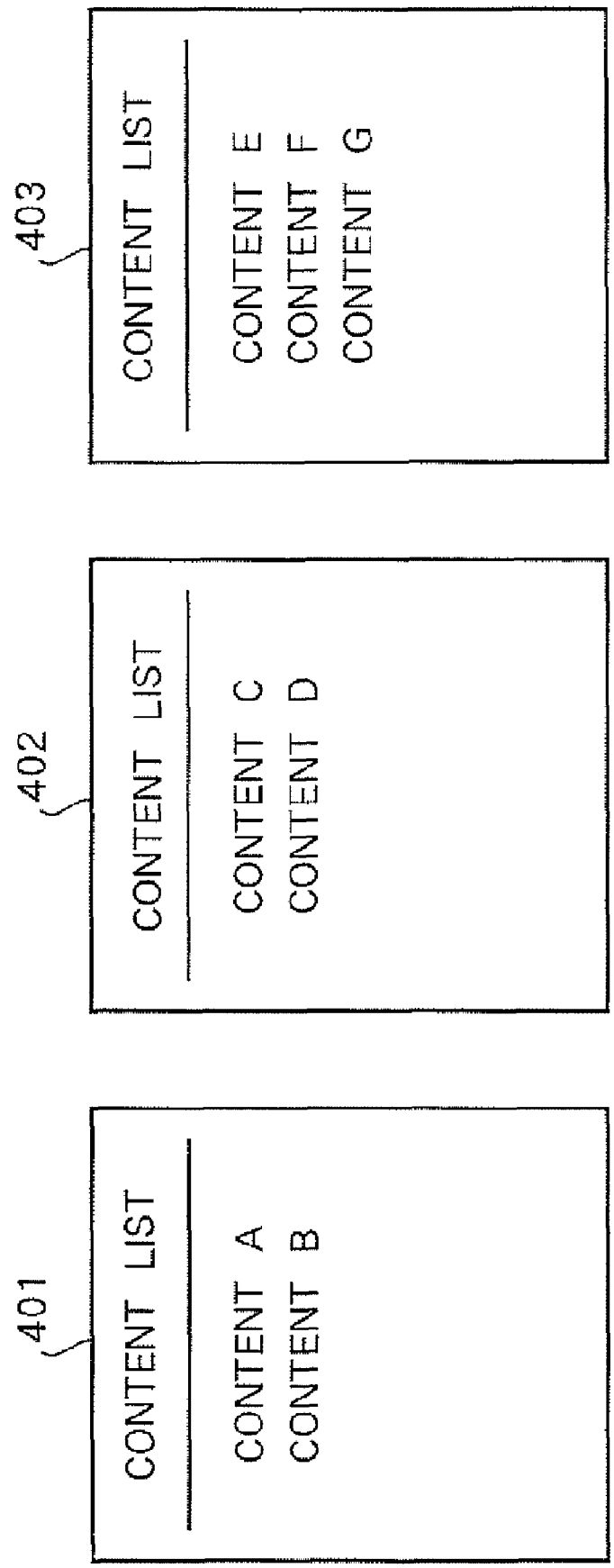
FIG. 4 is a drawing showing examples of display of content search results of a content display apparatus according to one embodiment of the present invention.

FIG. 4 is a drawing showing examples of content search results displayed by browser section 205 of a content display apparatus 104 according to this embodiment. Search results lists 401, 402, and 403 correspond to cases where content display apparatus 104 is at points 301P, 302P, and 303P respectively. When the user selects content that he or she wishes to view from a search results list displayed by browser section 205, content display apparatus 104 accesses the general Web server 103 corresponding to the selected content and displays location-dependent content on browser section 205.

In this way, content display apparatus 104 can execute search processing for list content, and search for location-dependent content efficiently by sequentially updating the content search results list presented to the user while changing location.

Content formats according to this embodiment will now be described.

First, content information of location-dependent content according to this embodiment will be described using FIG. 5. FIG. 5 is a drawing showing an example of content information according to this embodiment.

Content information, which is location-dependent content metadata, is written in an XML (Extensible Markup Language) compliant description language. In the format of this embodiment, a dummy namespace called ContentInfo is defined when writing content information. All examples written in XML given in this embodiment are incomplete XML documents with the XML declaration, Namespace declaration, and so forth, omitted.

In content information 500 in FIG. 5, several kinds of information relating to location-dependent content are entered between the ContentInfo element start tag (XML statement 501) and end tag (XML statement 509). XML statement 502 is a language element indicating the language in which the content contents are written.

XML statements 503 denote the content title and category, and keywords to be used in a search. XML statements 504 comprise a Date element containing information indicating the content creation date, period of validity, and update date. XML statements 505 comprise a Location element in which current location information is written. As sub-elements, the location element has a Coordinate element (latitude and longitude coordinate values), Address element, and ZipCode element. Of these, the item corresponding to geographical location information is the Coordinate element.

XML statements 506 comprise a ContactAddress element in which contact address details (telephone number and e-mail address) relating to the content are written. XML statement 507 is a Reference element in which a content contact address is written as a URL. This corresponds to network location information. XML statements 508 comprise an Abstract element that gives an overview of the content in text.

FIG. 6 is a drawing showing an example of simple content information of a content display apparatus according to one embodiment of the present invention. Content information 600 includes as sub-elements a Title element, a Category element, a Coordinate element as geographical location information, a Reference element as network location information, and a Metadata element. The Metadata element here is an element that describes a URI indicating the address of metadata of the content written in the Reference element.

List content will now be described with reference to FIG. 7. FIG. 7 is a drawing showing an example of list content of a content display apparatus according to one embodiment of the present invention.

List content 700 in FIG. 7 is enclosed by a ListContent element start tag (XML statement 701) and end tag (XML statement 702), and listed therebetween are MeshArea elements comprising XML statements 703a through 703c. These XML statements 703a through 703c correspond to rectangular mesh areas set in a geographical distribution region of location-dependent content.

In the example in FIG. 7, the MeshArea elements have attributes describing latitude and longitude coordinate values indicating the top-left vertex of a rectangular mesh area and the length of one side of a mesh area. In each MeshArea element, content information of location-dependent content included in the geographical region defined by that mesh area element is written by means of ContentInfo elements 704. These ContentInfo elements 704 comprise the content information shown in FIG. 5 and FIG. 6.

Next, content search processing for list content 700 shown in FIG. 7 will be described. Content display apparatus 104 extracts content information included in a ROI from list content, and presents this to the user as locality information search results. More specifically, content display apparatus 104 repeats the following series of processes: (1) ROI setting, (2) search for content information of location-dependent content included in the ROI, (3) display of retrieved content information, and (4) acquisition and display of location-dependent content corresponding to content information selected by the user.

FIG. 8 is a drawing showing an example of content output as the results of content search processing for a content display apparatus 104 according to one embodiment of the present invention. This content output 800 is formatted by content display control section 204, and displayed by browser section 205.

Figure 9:
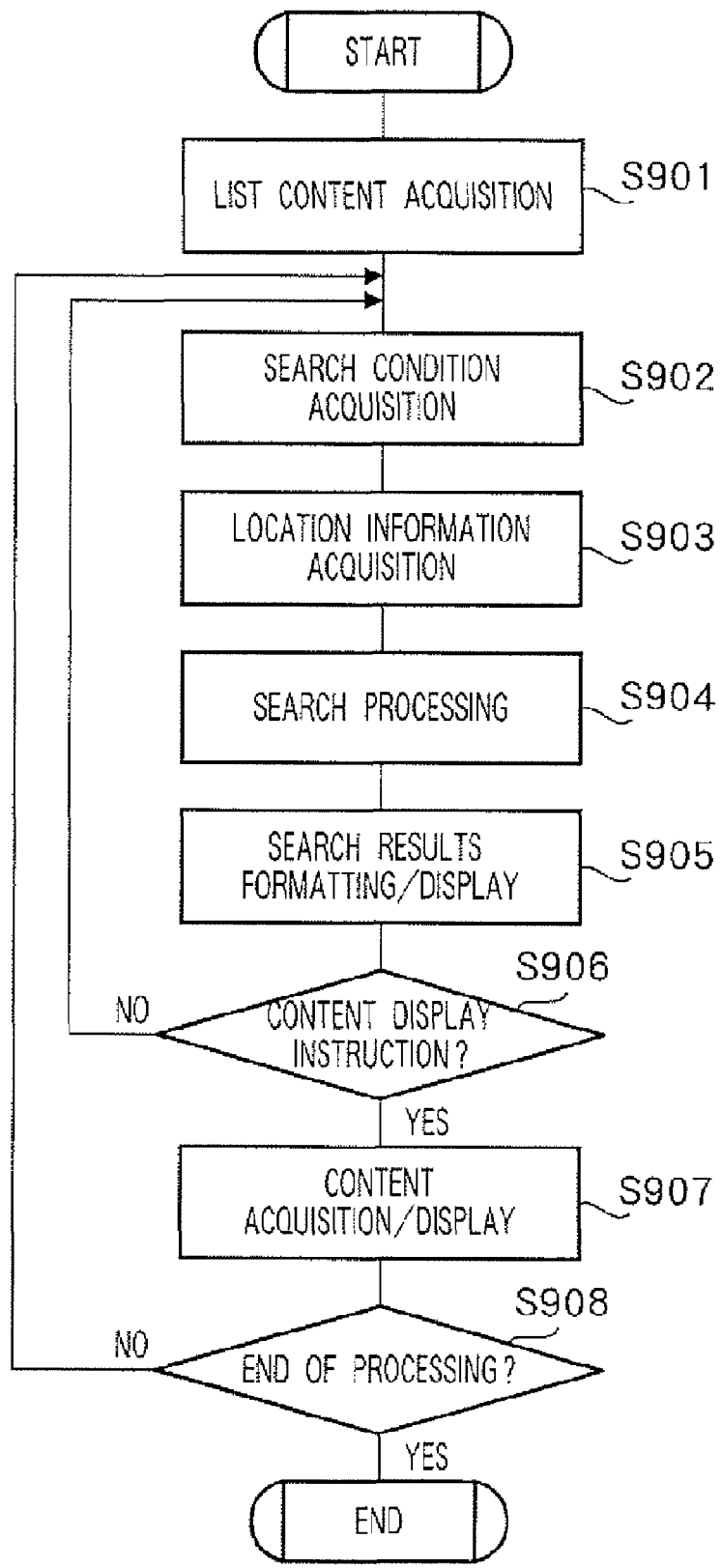
FIG. 9 is a flowchart showing the content search processing procedure of a content display apparatus according to one embodiment of the present invention.

Content search processing in content display apparatus 104 of this embodiment will now be described using FIG. 9. FIG. 9 is a flowchart showing the content search processing procedure of a content display apparatus 104 according to one embodiment of the present invention.

In content display apparatus 104, content processing section 203 receives list content from content broadcasting server 101 or a content communication server 102 via broadcast interface section 201 or communication interface section 202 (S901). Then content display apparatus 104 acquires a search condition set by the user via GUI section 210 (S902). Content display apparatus 104 then acquires location information of the current location by means of location information acquisition section 208 (S903). Next, content processing section 203 executes content search processing on the list content, using the information acquired in S902 and S903 as search conditions.

Content output by this content search processing is data in which the kind of content information shown in FIG. 8 is listed. Then content display apparatus 104 performs analytical processing on the content search processing results in content processing section 203, and displays an icon indicating the location of retrieved location-dependent content on a map displayed by map processing section 209. Simultaneously with this, content display control section 204 formats the content search processing results and displays a content search processing results list on browser section 205 (S905).

If the user selects one item of content from the content search processing results (YES in S906), that is, if there is a content display instruction, by means of a control section 207 instruction, the location-dependent content corresponding to the selected content information is acquired in content processing section 203, and display is performed by browser section 205 via conversion processing by content display control section 204 (S907). On the other hand, if there is no content display instruction (NO in S906), content processing section 203 returns to S902, and repeats the series of content search processing steps. After S907, control section 207 performs processing termination determination (S908).

That is to say, unless there is an instruction to terminate content search processing, content processing section 203 returns to S902 and continues the series of content search processing steps (NO in S908). If there is an instruction to terminate content search processing, content processing section 203 terminates content search processing (YES in S908).

Next, the GUI for location-dependent content searching (retrieval) in a content display apparatus 104 of one embodiment of the present invention will be described with reference to FIG. 10 through FIG. 19.

Figure 10:
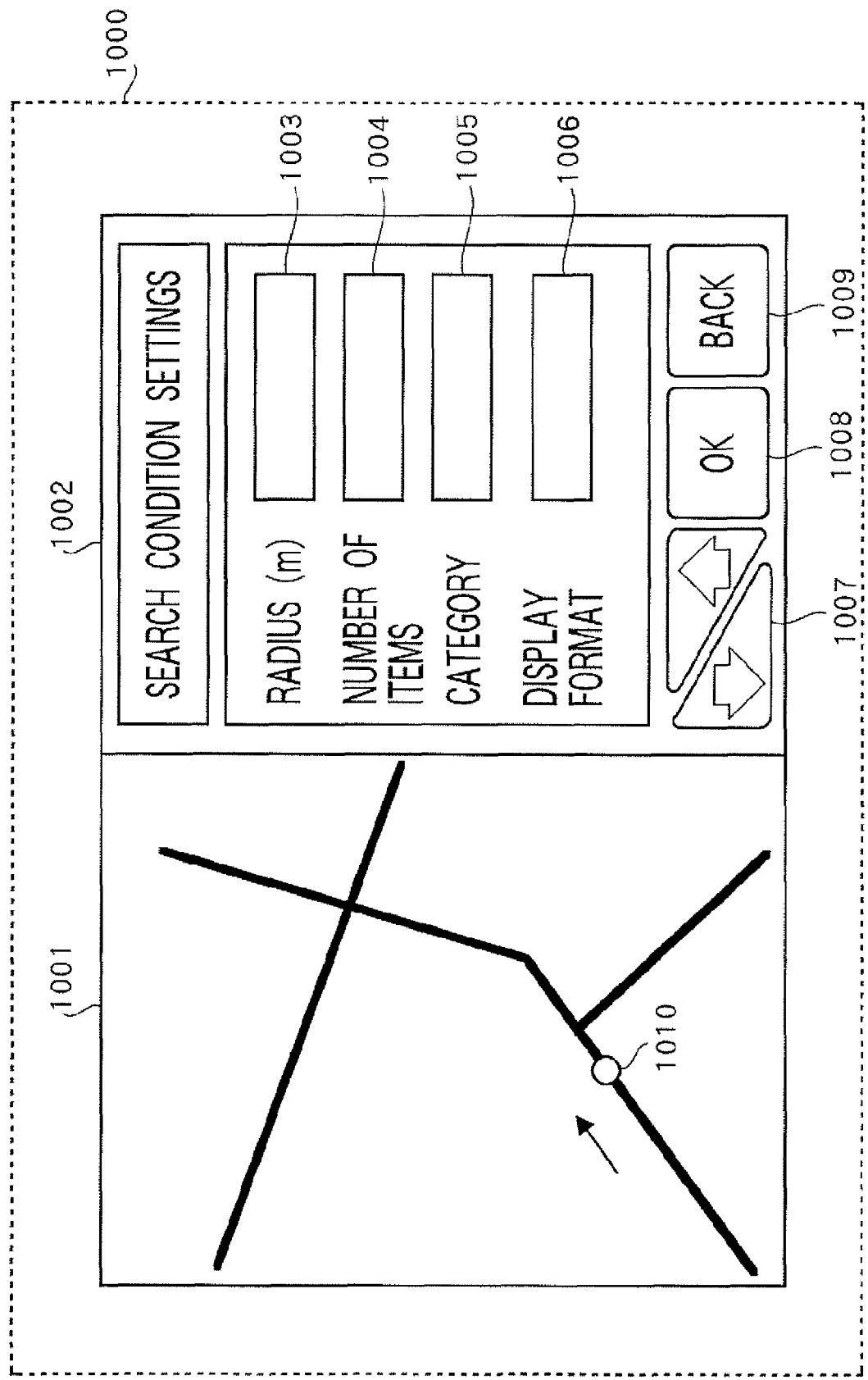
FIG. 10 is a drawing showing a locality information search screen of a content display apparatus according to one embodiment of the present invention.

FIG. 10 is a drawing showing an example of the GUI screen of a content display apparatus 104 of this embodiment. This GUI screen 1000 is composed of a map display section 1001 on the left and a search condition setting section 1002 on the right. On map display section 1001 is displayed a map of the current locality including a point 1010 indicating the current location of content display apparatus 104. Search condition setting section 1002 is a GUI for performing content search condition setting. The display processing of this GUI screen 1000 mainly involves browser section 2C5, map processing section 209, and GUI section 210 in FIG. 2.

Search condition setting section 1002 has a radius setting box 1003, a number of search items setting box 1004, a category setting box 1005, and a display format setting box 1006. Radius setting box 1003 is used to input the radius of a ROI that is the content search range, number of search items setting box 1004 is used to input the number of content search items, category setting box 1000 is used to input the category of content to be searched for, and display format setting box 1006 is used to specify the display format for content search results.

Although not shown in the drawing, GUI screen 1000 is assumed to be capable of displaying a GUI for data input to input boxes 1003 through 1006. For example, touch keys for specifying a numeric value are displayed on GUI screen 1003 for setting the ROI radius and number of content search items, and a panel for selection from a list is displayed for setting the category and search results display format. GUI screen 1000 also includes various buttons 1007 through 1009 providing a GUI for search condition setting. Cursor buttons 1007 are for moving the cursor, OK button 1008 is for confirming input data, and back button 1009 is for going back to the previous screen.

Figure 11:
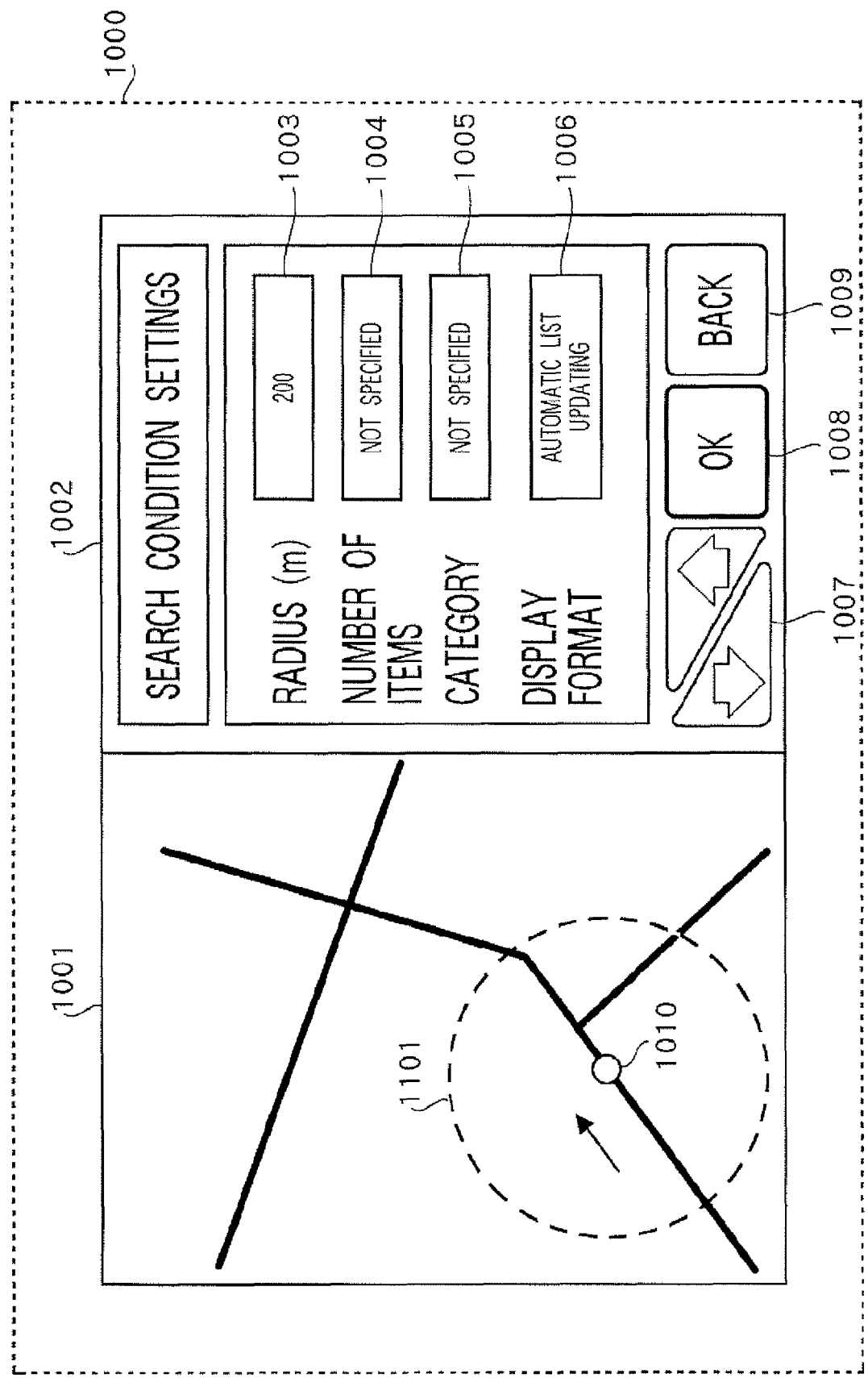
FIG. 11 is a drawing showing a locality information search screen of a content display apparatus according to one embodiment of the present invention.

FIG. 11 is a drawing showing an example of the GUI screen of a content display apparatus 104 of this embodiment, showing a situation in which content search conditions have been set in search condition setting section 1002. In this example, the radius of ROI 1101 is 200 meters, the number of content search items and category are unspecified, and the content search processing results display method is "Automatic List Updating." Setting ROI 1101 in this way enables a moving user to search for content relating to his or her current locality.

In this embodiment, there are assumed to be two kinds of content search processing results display format: "Automatic List Updating" and "Fixed List." "Automatic List Updating" is a mode in which content search processing is executed periodically, and content search processing results displayed on GUI screen 1000 are automatically updated, as content display apparatus 104 changes location. On the other hand, "Fixed List" is a mode in which the latest content search processing results are retained and new content search processing is not executed. The user clicks OK button 1008 when setting of content search conditions is completed as shown in FIG. 11.

Figure 12:
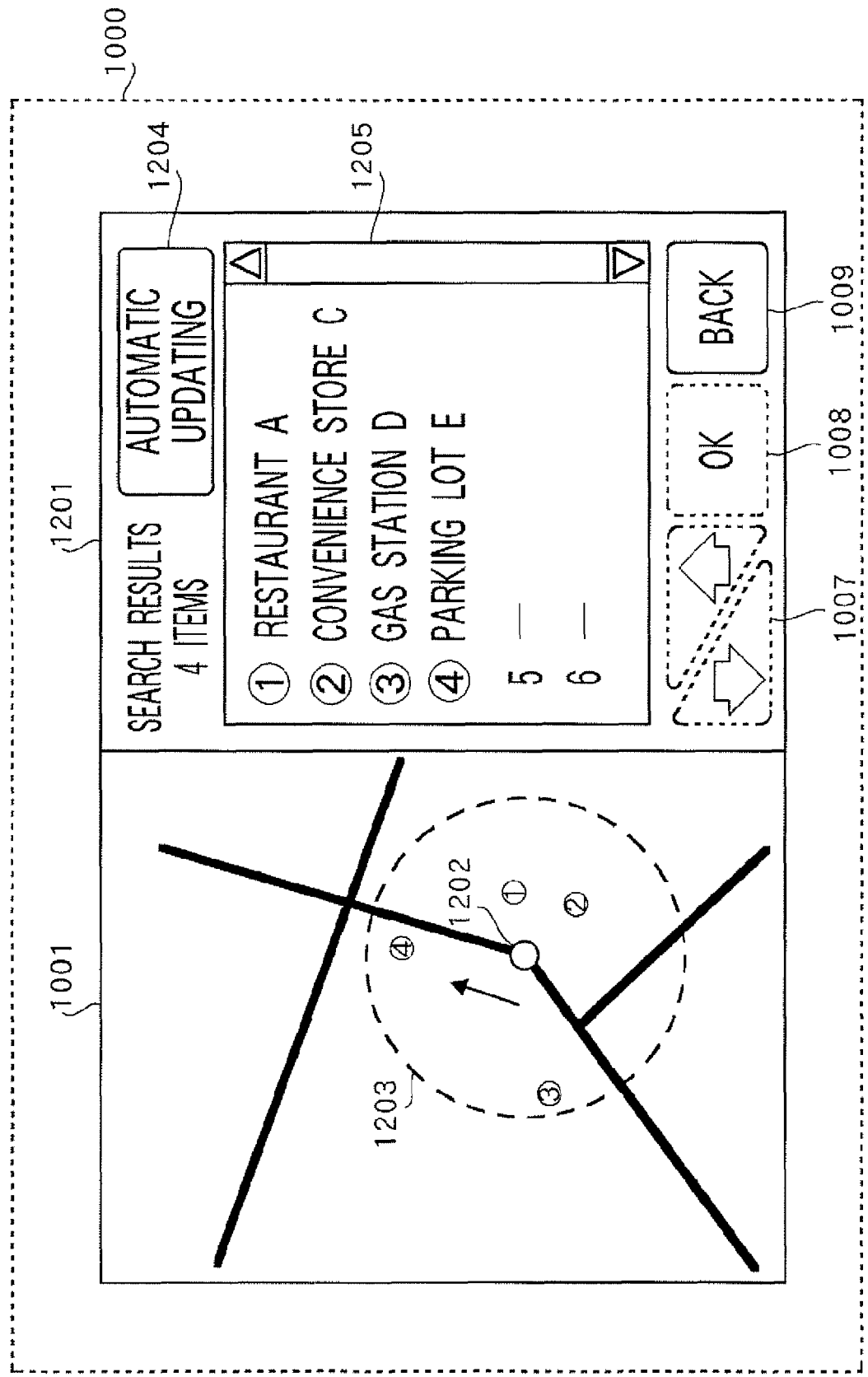
FIG. 12 is a drawing showing a locality information search screen of a content display apparatus according to one embodiment of the present invention.

FIG. 12 is a drawing showing an example of content search processing results display on a content display apparatus 104 of this embodiment. The left-hand side of GUI screen 1000 is map display section 1001, and the right-hand side is a search results display section 1201. In map display section 1001, a point 1202, which is the current location of content display apparatus 104, and a ROI 1203 having the specified radius, are displayed superimposed one upon the other. By this means, the content search area is displayed on a map when searching for content relating to the current locality on the map, enabling the user to confirm visually the distance from the user's current location to retrieved content. In search results display section 1201, a display format change button 1204 and a content information list 1205 are displayed.

Display format change button 1204 is a toggle button that changes the content search processing results display format. By clicking display format change button 1204, the user sets the display mode to either "Automatic List Updating" or "Fixed List." Content information list 1205 displays titles of content information extracted from list content in accordance with the content search conditions set in search condition setting section 1002.

At the same time as this, icons (in FIG. 12, circled numbers) showing the geographical locations of location-dependent content corresponding to content information are displayed in map display section 1001. As shown in FIG. 12, information displayed in map display section 1001 is associated with information displayed in content information list 1205 by means of numbers or other symbols. In this example, there is a restaurant A, a convenience store C, a gas station D, and a parking lot E in ROI 1203. In the situation shown in FIG. 12, the user can go back to the search condition setting screen in FIG. 11 by clicking back button 1009.

As location-dependent content search results are listed as a display list and the locations of retrieved location-dependent content are displayed on a map in this way, the user can visually confirm the geographical distribution of retrieved content before deciding on the content actually to be viewed.

If ROI 1203 is too large for the map being displayed in map display section 1001, the scale of the map can be changed, and content processing section 203 can be displayed on the rescaled map. Similarly, if ROI 1203 is too small for the map being displayed in map display section 1001, the scale of the map can be changed so that ROI 1203 is displayed at a suitable size on the map.

Figure 13:
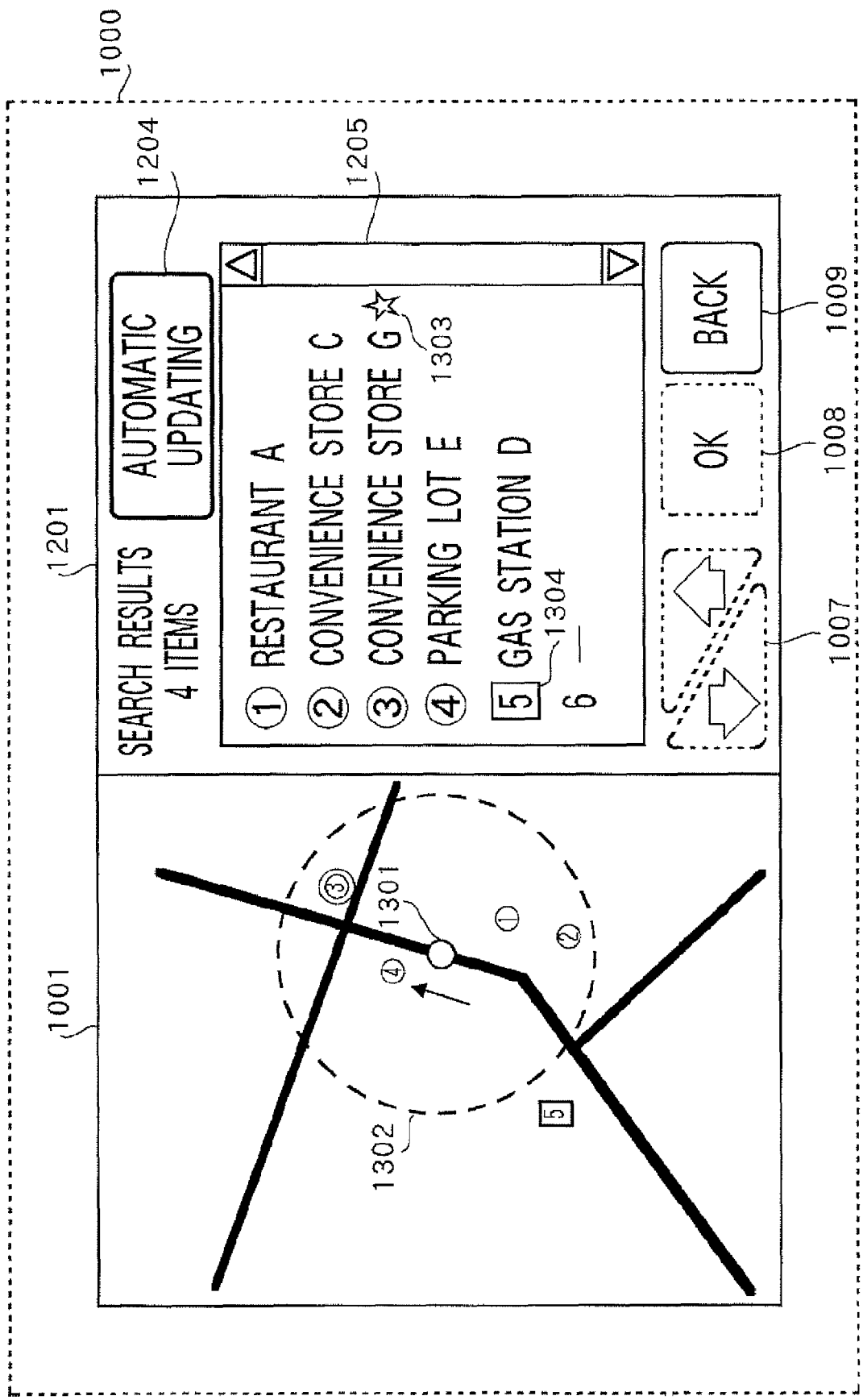
FIG. 13 is a drawing showing a locality information search screen of a content display apparatus according to one embodiment of the present invention.
Figure 14:
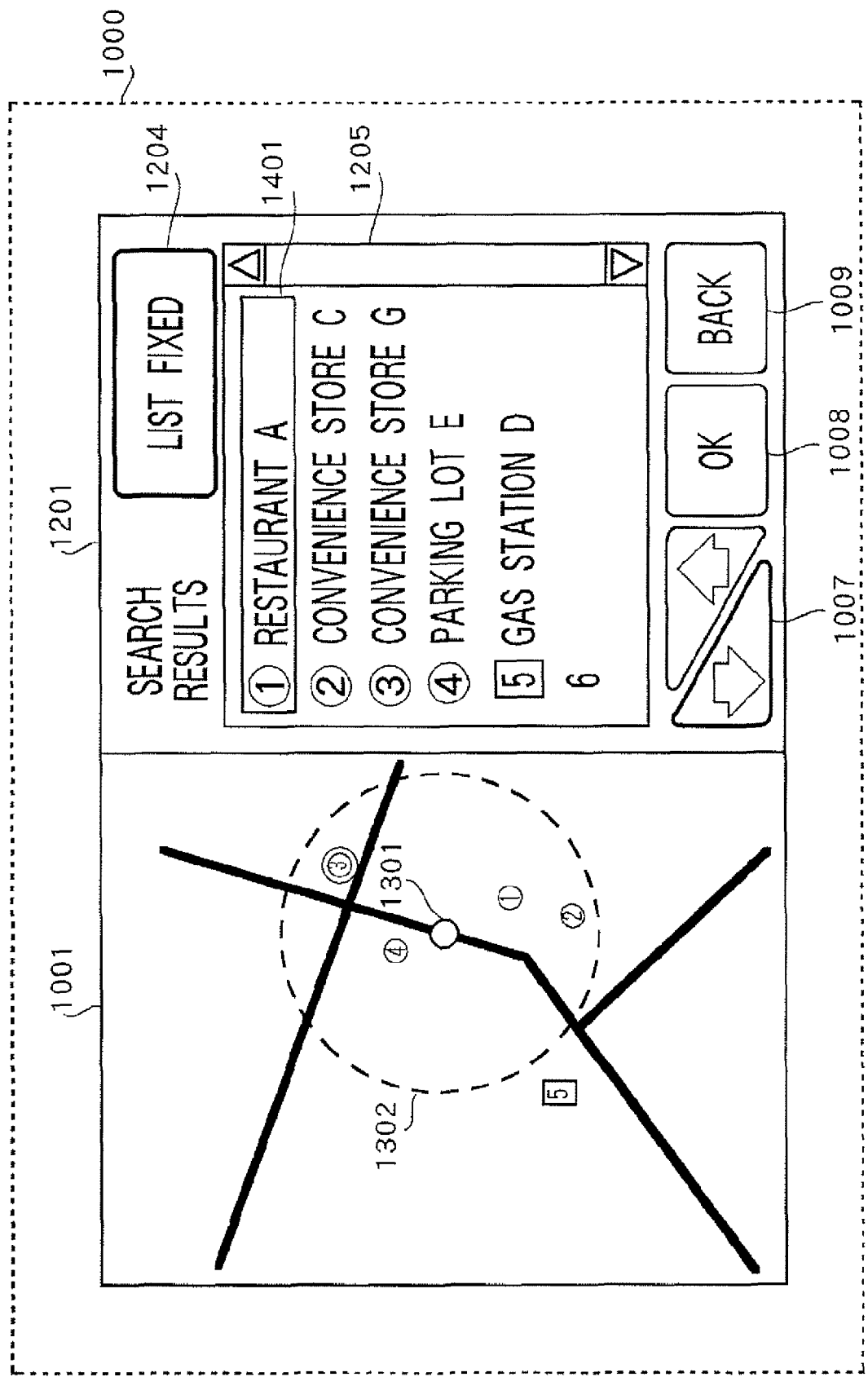
FIG. 14 is a drawing showing a locality information search screen of a content display apparatus according to one embodiment of the present invention.

FIG. 13 is a drawing showing an example of the GUI screen of a content display apparatus 104 of this embodiment when content display apparatus 104 moves and current locality content is searched for again. In this example, the current location of content display apparatus 104 changes to a point 1301, and as a result, location-dependent content in a ROI 1302 is different.

Specifically, gas station D is now outside ROI 1302, and a convenience store G has newly entered ROI 1302. In content information list 1205, numbers and display positions in the list are the same for restaurant A, convenience store C, and parking lot E, which are common to the previous search results. The third item, gas station D, has been replaced by convenience store G, and gas station D has been moved to fifth position in the list.

Thus, in map display section 1001 and the content information list, content information included in the latest ROI 1302 is displayed, and a content search history is also retained, showing content information retrieved up to now.

Also, to differentiate between the latest content information and past content information in map display section 1001 and content information list 1205, differentiation is performed by means of the number or symbol assigned to content information. In the example in FIG. 12, a circled number is assigned to latest content information, and a number inside a box 1304 is assigned to past content information.

As content information retrieved in the past is displayed clearly differentiated in this way, the user can ascertain the update status of the search results list before making use of past content search results.

Furthermore, newly retrieved content information not included in previous search results is made noticeable by displaying a special symbol. In the example in FIG. 13, a star symbol 1303 is appended to newly retrieved convenience store G in content information list 1205, and the number indicating location-dependent content is ringed by double circles in map display section 1001.

Additional information will now be given concerning the method of displaying content information list 1205. The content information list updating rules according to this embodiment are: (1) content information included in both the previous and latest search results is displayed without changing its display position in the list; (2) content information included in the previous search results but not included in the latest search results is deleted from the list, and that display line is left blank; (3) content information not included in the previous search results but included in the latest search results is inserted in a blank area, or is added to the bottom of the list if there is no blank area; and (4) content information included in past search results but not included in the latest search results is added at the very bottom (end) of the list.

Thus, in map display section 1001 and content information list 1205, content information included in the latest ROI and content information retrieved in the cast are clearly differentiated, and displayed simultaneously, making content search results clearly visible and improving the convenience of the content search section. Also, since not only the latest content search results but also past content search results are displayed in the search results list, the user can ascertain the update status of the search results list before making use of past content search results.

The user refers to content search results such as shown in FIG. 13, and if he or she finds desired content, clicks display format change button 1204. GUI screen 1000 is then updated to the state shown in FIG. 14, the display format mode displayed on display format change button 1204 becomes "Fixed List," and one content information item can be selected from content information list 1205 using cursor buttons 1007.

An icon indicating the location of location-dependent content displayed on map display section 1001 is associated with content information displayed in content information list 1205, and content information can also be selected by clicking the corresponding icon on the map.

Figure 15:
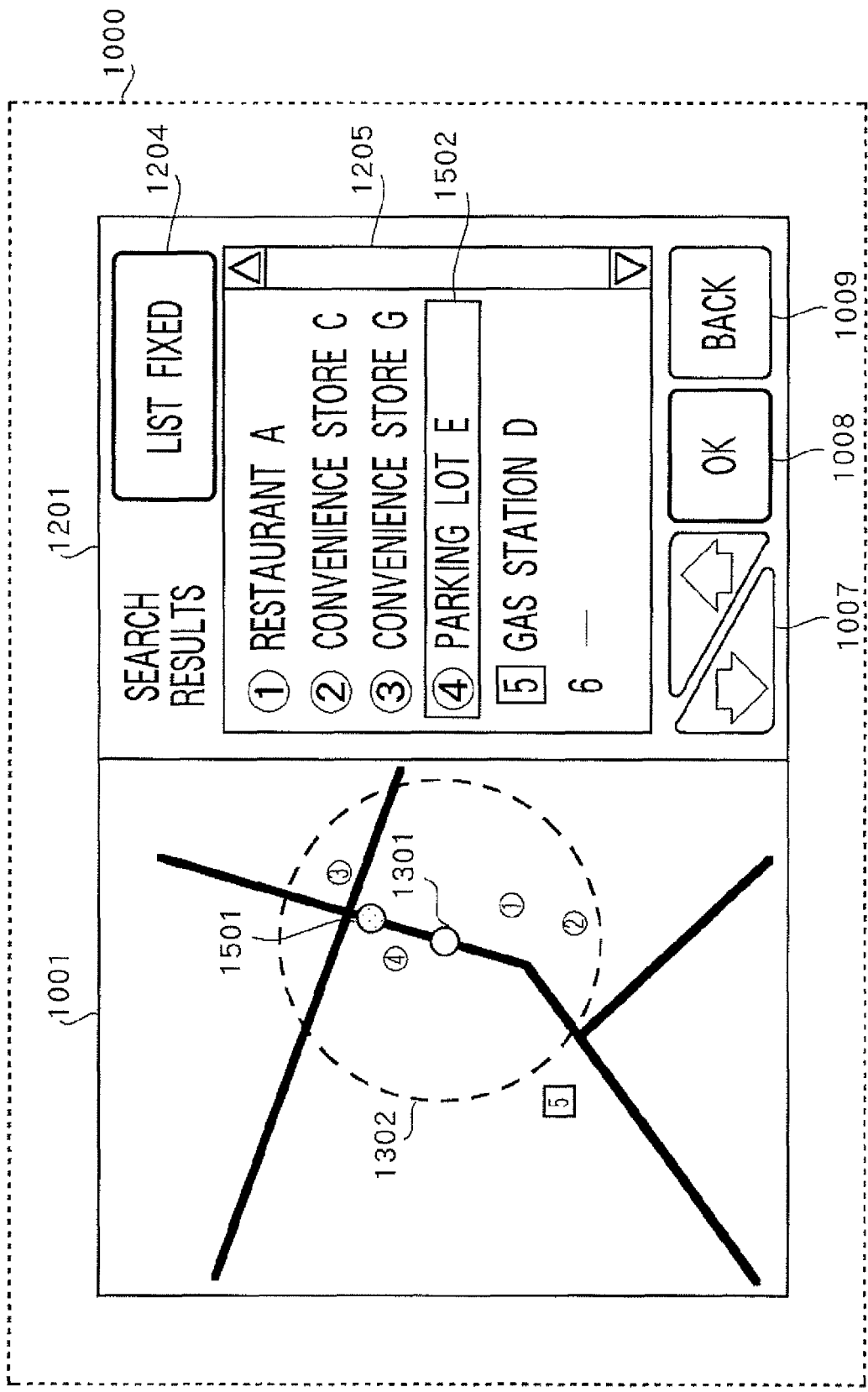
FIG. 15 is a drawing showing a locality information search screen of a content display apparatus according to one embodiment of the present invention.

FIG. 15 is a drawing showing a situation in which the user selects the fourth item, parking lot B, from content information list 1205 using cursor buttons 1007 on a content display apparatus 104 of this embodiment. When the "Fixed List" mode is set, the content information list is not automatically updated even if content display apparatus 104 mores. In map display section 1001, ROI 1302 fixed when the transition was made to "Fixed List" mode is displayed, and current location 1501 of moving content display apparatus 104 is displayed at the same time.

Thus, when the user refers to the display list, content list updating can be stopped temporarily, and updating of the display of the latest current location information on the map can be continued. By displaying content search results at a certain fixed location and also displaying the latest terminal location information in this way, it is easy to ascertain the relationship in terms of geographical location between desired location-dependent content and a content display apparatus 104. Also, in FIG. 15, the display color of an icon displayed on map display section 001 corresponding to number 1502 of content information selected by the user by means of cursor buttons 1007 may be changed, or the icon may be made to flash.

In this way, the visibility of the icon corresponding to selected content information is improved. Also, if the location of content selected from content information list 1205 is off the map being displayed on map display section 1001, it is assumed that the map on map display section 1001 is redrawn so that the selected content is displayed.

With the screen display as shown in FIG. 15, if the user clicks display format change button 1204 or back button 1009 the state shown in FIG. 13 is restored, and a current locality content search is executed periodically as content display apparatus 104 changes location. If the user clicks OK button 1008, the GUI screen changes to the state shown in FIG. 16.

Figure 16:
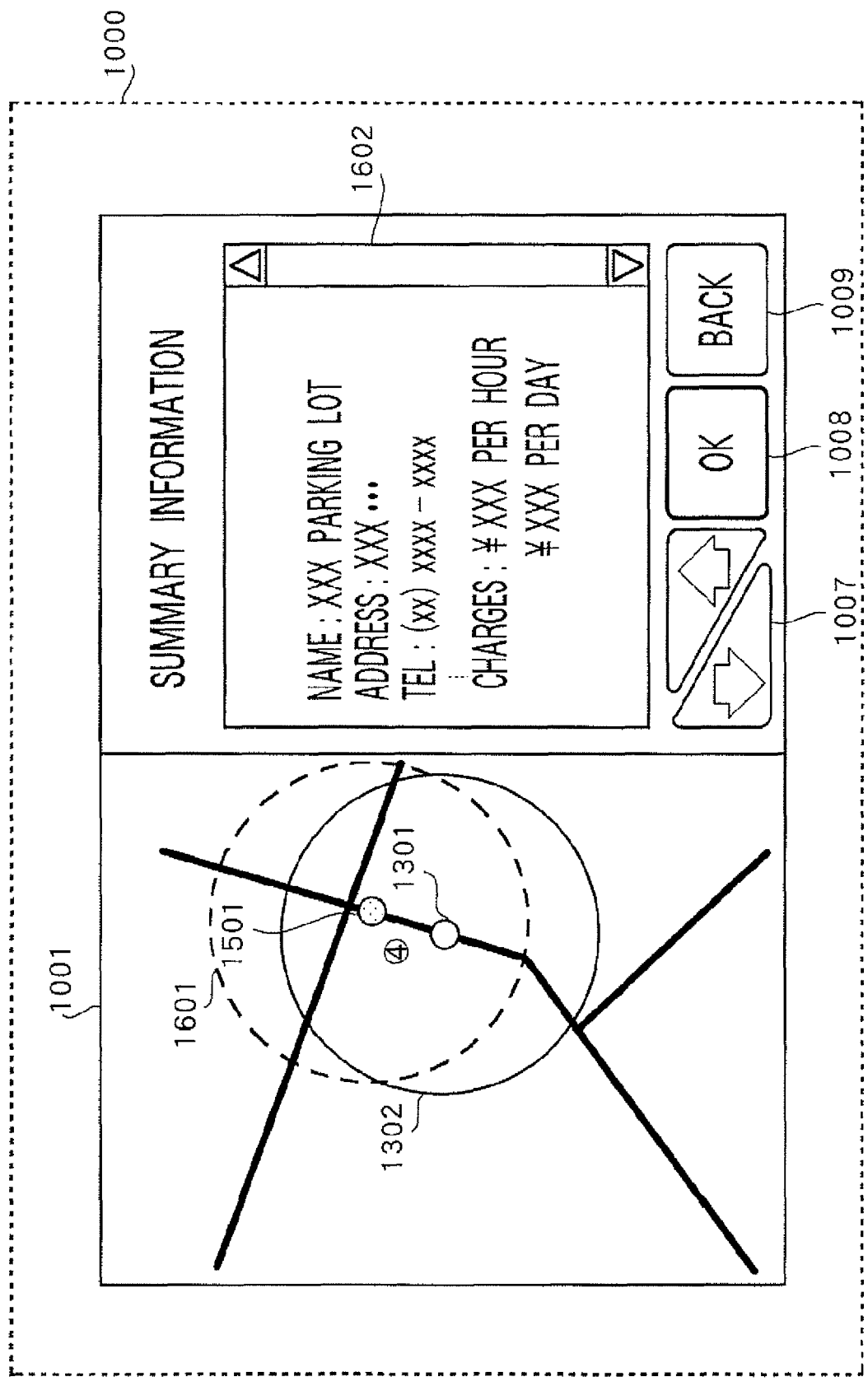
FIG. 16 is a drawing showing a locality information search screen of a content display apparatus according to one embodiment of the present invention.

FIG. 16 is a drawing showing an example of GUI screen display on a content display apparatus 104 of this embodiment. In FIG. 16, GUI screen 1000 has a summary information display section 1602. Content information converted to a format that can be displayed by a browser is displayed in this summary information display section 1602. In this example, a case is illustrated in which list content contains content information comprising the content name, address, telephone number, location-dependent content network location information (URI), and content summary information (in FIG. 16, charge information).

Content display apparatus 104 generates content in a format that can be displayed by a browser from content information specified by the user, and displays that generated content in summary information display section 1602 as shown in FIG. 16. When content information is displayed in this way, the user can get an overview of location-dependent content before deciding whether or not to actually acquire and view that location-dependent content.

Meanwhile, map display section 1001 in FIG. 16 displays ROI 1302 when the latest content search was executed, the location of location-dependent content corresponding to content information being displayed in summary information display section 1602, point 1501, which is the current location of content display apparatus 104, and a ROI 1601 with point 1501 at its center. The reason for displaying ROI 1601 centered on point 1501 is to enable the user to easily confirm the relationship in terms of geographical location between location-dependent content indicated by the summary information and content display apparatus 104.

For example, if, as a result of content display apparatus 104 moving while the user is checking summary information, a situation arises in which location-dependent content indicated by the summary information is already located far from content display apparatus 104, the user can ascertain that situation by referring to map display section 1001, and search again for content in the current locality as necessary.

With the screen display as shown in FIG. 16, if the user clicks back button 1009 the state shown in FIG. 15 is restored, and content information can be selected again from the content information list. If the user clicks OK button 1008 when the screen display is as shown in FIG. 16, GUI screen 1000 changes to the state shown in FIG. 17.

Figure 17:
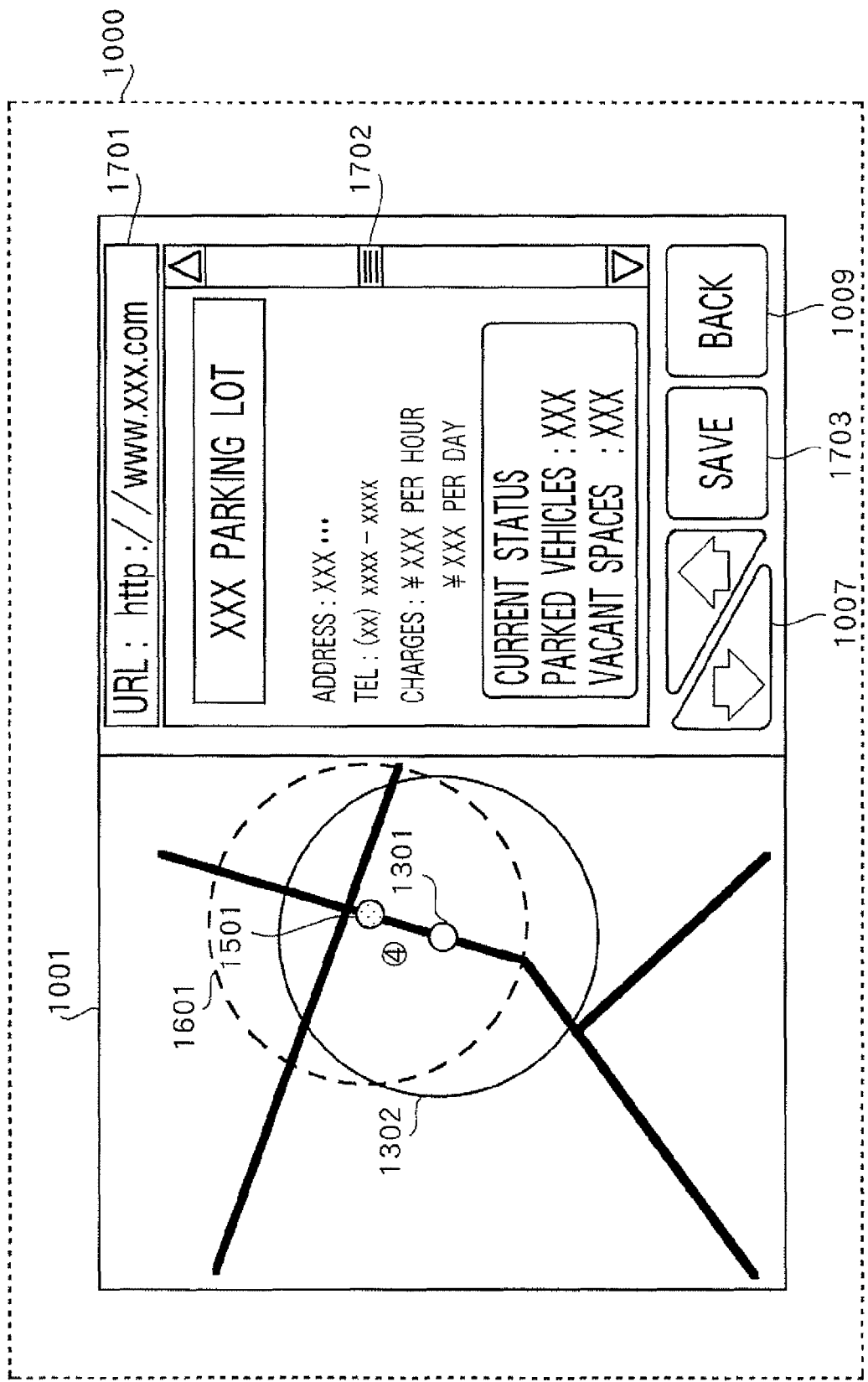
FIG. 17 is a drawing showing a locality information search screen of a content display apparatus according no one embodiment of the present invention.

FIG. 17 is a drawing showing an example of GUI screen display on a content display apparatus 104 of this embodiment. It is here assumed that the user has clicked OK button 1008 in FIG. 16 and GUI screen 1000 has chanced to the state shown in FIG. 17.

GUI screen 1000 in FIG. 17 has a URL display section 1701 and a content display section 1702. In URL display section 1701 a URL written in content information selected by the user is displayed, and in content display section 1702 location-dependent content corresponding to the URL displayed in URL display section 1701 is displayed. GUI screen 1000 also has a save button 1703.

Save button 1703 is for saving the URL and content information of location-dependent content currently being displayed in content display section 1702. For example, if the user judges that the location-dependent content currently being displayed in content display section 1702 is useful and is likely to be viewed again, the user saves the information by clicking save button 1703. Saved content information can be displayed in summary information display section 1602 at any time, and when OK button 1008 in FIG. 16 is clicked, content indicated by the URI extracted from content information is displayed as shown in FIG. 17.

Figure 18:
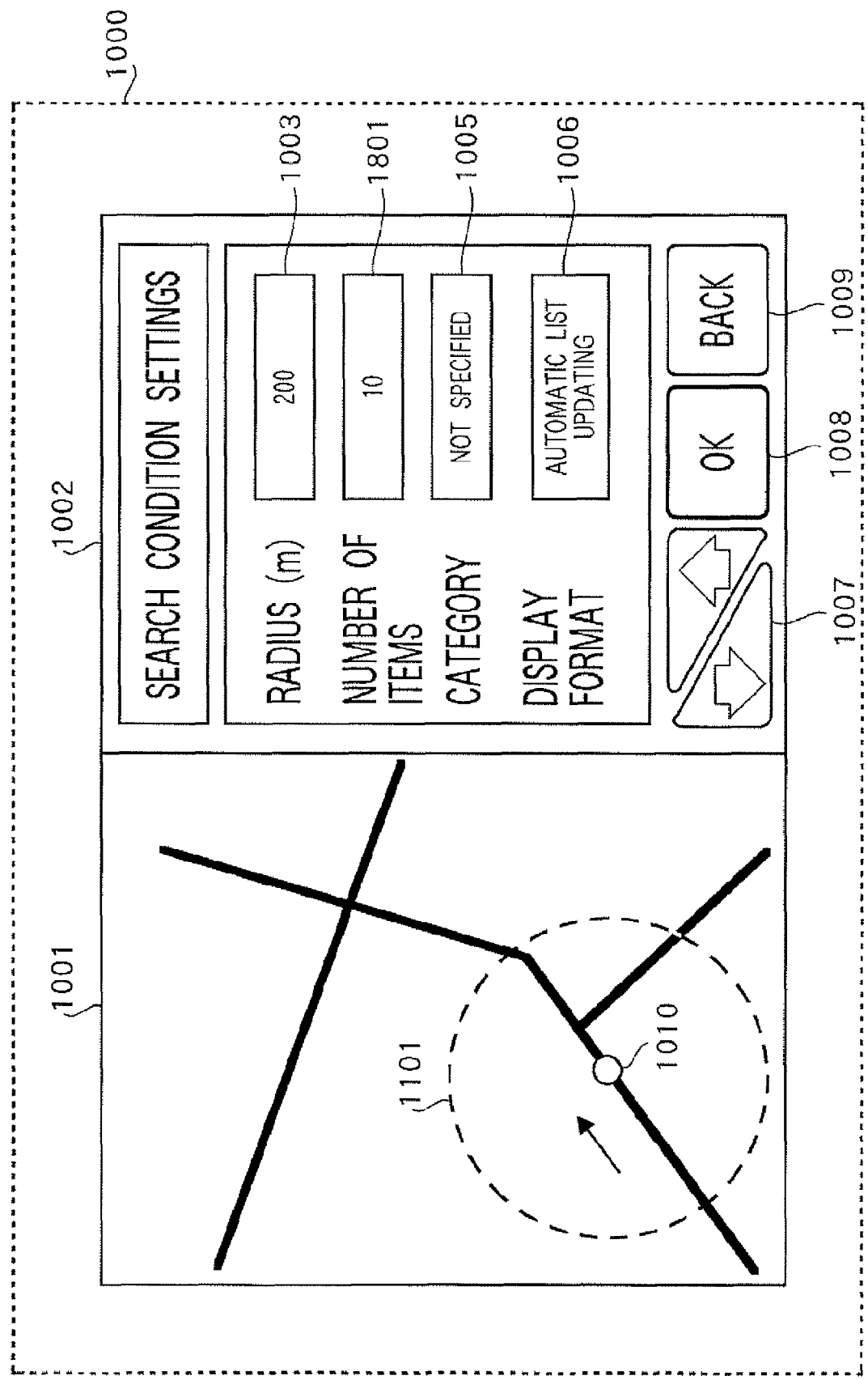
FIG. 18 is a drawing showing a locality information search screen of a content display apparatus according to one embodiment of the present invention.
Figure 19:
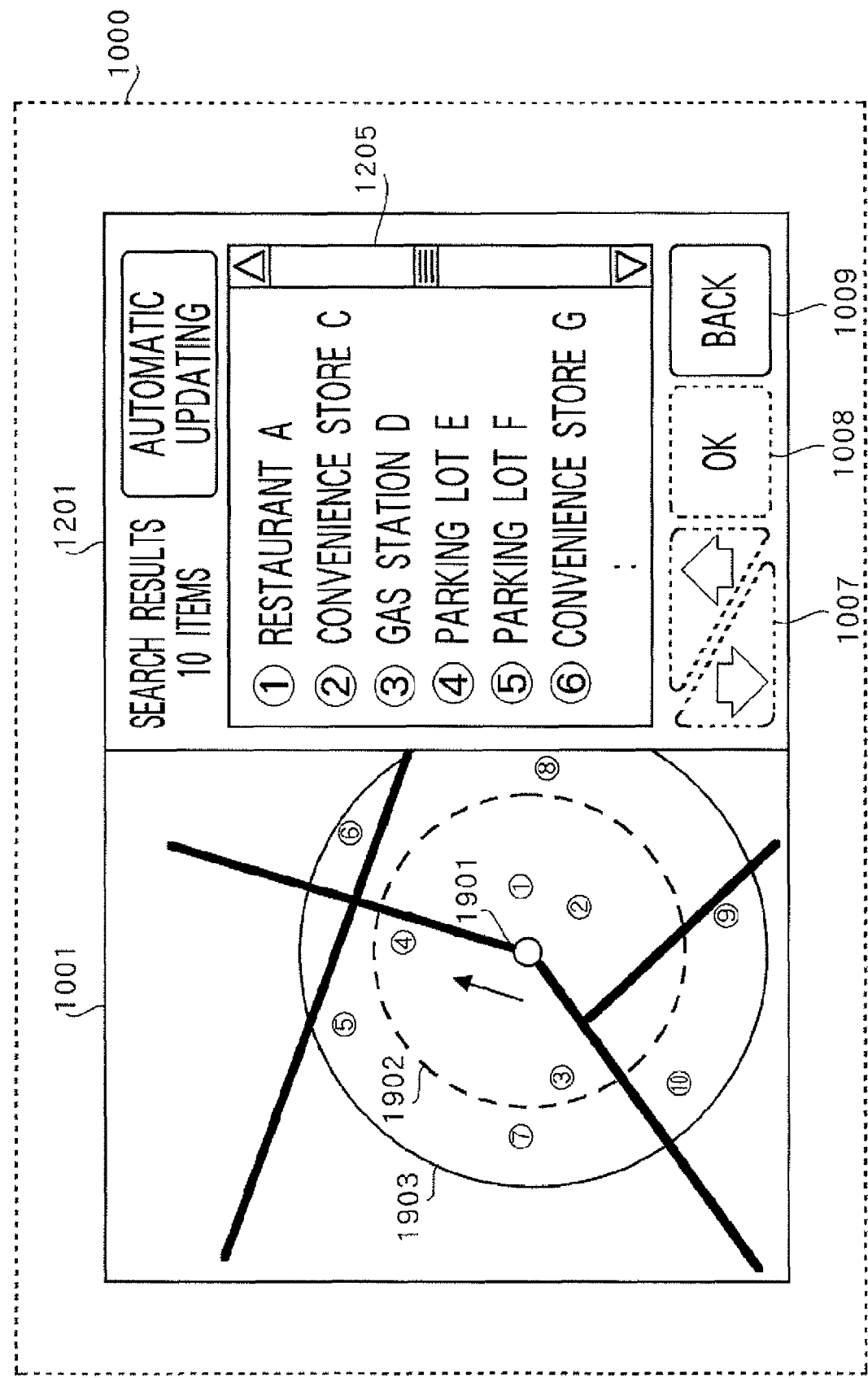
FIG. 19 is a drawing showing a locality information search screen of a content display apparatus according to one embodiment of the present invention.

Next, a content search example will be illustrated in FIG. 18 and FIG. 19 in which the radius of ROI 1101 and the number of search items are specified. FIG. 18 and FIG. 19 are drawings showing examples of GUI screen displays on a content display apparatus 104 of this embodiment. If the radius of the ROI is not set, it is assumed that a radius defined beforehand is set.

In FIG. 18, GUI screen 1000 has a search condition setting section 1002 showing a state in which the radius of ROI 1101 is set to 200 meters, the number of content search items is set to 10 (or more), the category is unspecified, and the display format is set to Automatic List Updating. When the user clicks OK button 1008 with these condition settings, GUI screen 1000 changes to the state shown in FIG. 19.

FIG. 19 shows an example in which search processing is performed for list content based on the conditions specified in FIG. 19, and content search results are displayed on the screen. In this example, two Regions Of Interest (ROIs), 1902 and 1903, are displayed in map display section 1031. ROI 1902 indicated by a dashed line is a circular area with the 200 meter radius set by the user. In this example, only four content items are included in this circular area.

When the number of content items included in ROI 1902 is less than the number of content search items specified by the user in this way, content display apparatus 104 adjusts the radius of the circle so as to approach the number of content search items specified by the user, and re-sets ROI 1903.

Conversely, if the content in a user-specified ROI (not shown) exceeds the number of content search items specified by the user, content display apparatus 104 decreases the radius of the ROI so as to approach the number of content search items specified by the user. Providing content display apparatus 104 with a function for adjusting the radius of a ROI so as to satisfy the number of content search items specified by the user in this way improves the convenience of content search items.

When the number of search items is specified as a content search condition in this way, the size of the search area is adjusted dynamically, and content search results that satisfy the search specifications are output. By this means, the burden on the user when a content search is performed can be reduced.

Figure 20:
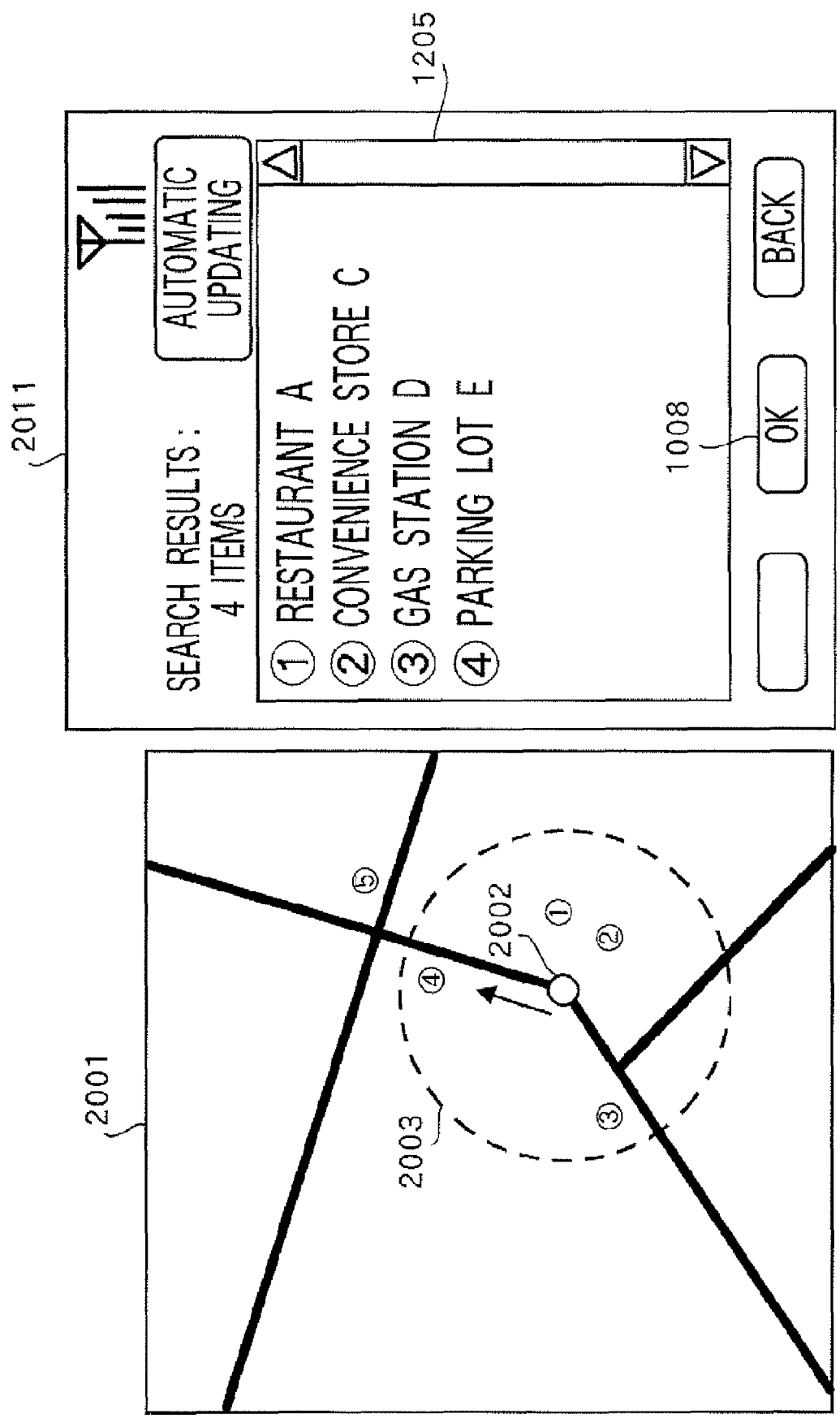
FIG. 20 is a first drawing showing a sample display on a mobile phone terminal of the present invention.
Figure 21:
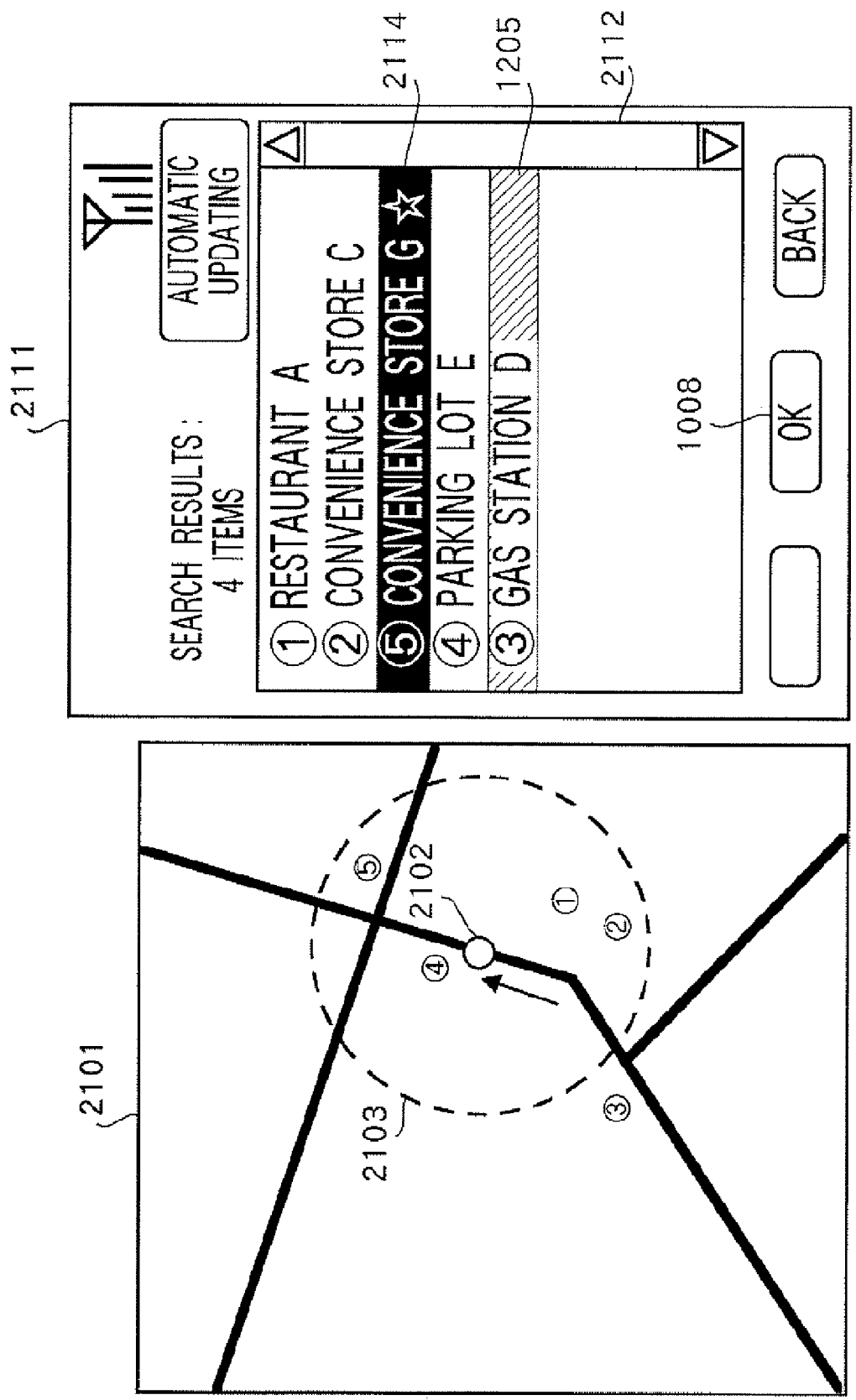
FIG. 21 is a second drawing showing a sample display on a mobile phone terminal of the present invention.

FIG. 20 and FIG. 21 are drawings showing sample displays on a mobile phone terminal of the present invention. FIG. 20 shows the same kind of situation as FIG. 12. A ROI 2003 with the current location of a user 20C2 at its center is shown on a map 2001. However, as the screen 2011 of the user's mobile phone is small, map 2001 is not displayed, and only search results 2012 for content within ROI 2003 are displayed.

FIG. 21 shows the situation after user 2002 has moved. As shown in FIG. 21, the user has changed his or her current location to 2102, and the ROI has simultaneously changed to 2103. Therefore, in the content displayed on the mobile phone screen 2111, convenience store G (2114) has been newly added, and gas station D (2115) is displayed at the bottom of the list as out-of-range information. This display method is similar to that in FIG. 13. In this way, content in the locality can be searched for while moving even with a mobile phone terminal. Also, in the example in FIG. 21, easy-to-understand display is implemented by varying the display methods for updated content and content that has become out-of-range. By this means, even if content is updated as the user moves, it is easy to recognize the distinction between updated content and non-updated content, and content that has become out-of-range.

In this embodiment, a content search area has been taken to be a circular area, but a content search area may be of any shape. For example, it is possible for a rectangular area of the same size as the map displayed in map display section 1101 of content display apparatus 104 to be used as a content search area, or a fan-shaped area widening in the direction of movement of content display apparatus 104 may be used.

In this embodiment, a mode has been adopted whereby content broadcasting server 101 or a content communication server 102 distributes list content as exemplified by FIG. 7 to a content display apparatus 104, and a general Web server 103 distributes location-dependent content to content display apparatus 104, but a plurality of content information items may be distributed instead of list content. Instead of retrieving content information from list content, content display apparatus 104 manages all received content information and retrieves content information from that managed information. In this way, a service provider need not generate and provide list content from content information as exemplified by FIG. 5 or FIG. 6, and the same kind of results can be obtained with content information alone.

Location-dependent content may be distributed by content broadcasting server 101 instead of being distributed by a general Web server 103. Content display apparatus 104 stores location dependent content received from content broadcasting server 101 in storage section 206, and acquires content from storage section 206 based on content information obtained by means of a list content or content information search. In this way, the same kind of results can be obtained even if content information and location-dependent content are provided from content broadcasting server 101 alone.

The present application is based on Japanese Patent Application No. 2004-168209 filed on Jun. 7, 2004, and Japanese Patent Application No. 2005-163088 filed on Jun. 2, 2005, entire content of which is expressly incorporated herein by reference.

INDUSTRIAL APPLICABILITY

As described above, a content display apparatus of the present invention provides clearly differentiated display of newly retrieved content information and previously retrieved content information. A content display apparatus of the present invention thereby has an effect of enabling a user to find desired content easily without reducing display list visibility even in a situation in which a content list is updated dynamically, and is suitable for use as a content display apparatus that displays information relating to content linked to a geographical location or the like.

The invention claimed is:

1. A content display apparatus comprising:
a metadata acquirer that acquires a collection of metadata including at least content location information indicating a geographical location linked to content and a resource identifier identifying a resource of the content;
a location information acquirer that periodically acquires location information indicating a current location;
a content processor that outputs, as a content list, a list of metadata matching a search condition that includes the location information acquired by said location information acquirer from the collection of metadata acquired by said metadata acquirer;
a content display controller that generates a display list in which the content list is formatted for presentation to a user; and
a search results display that displays the display list,
wherein said content display controller, when generating a latest display list, compares a latest content list and a previous content list, and generates the display list arranged so that the metadata included successively in both those content lists has a same display position as in the display list created using the previous content list; and
wherein said content display controller takes a previously generated display list as a base, and generates the display list in which a display position of the metadata included in only the previous content list is made a blank area and the metadata included in only the latest content list is inserted in the blank area or at the end.

2. The content display apparatus according to claim 1, wherein said content display controller generates the content list in which information indicating newly retrieved metadata is added to the metadata included in only the latest content list.

3. The content display apparatus according to claim 2, wherein said content processor sets a search area that is a geographical area containing a point indicated by the location information as a search condition, and outputs a list of the metadata included in the search area as the content list.

4. The content display apparatus according to claim 3, further comprising a map display that displays a map which indicates a geographical location indicated by the metadata included in the display list and on which a display symbol linked to the resource identifier is superimposed.

5. The content display apparatus according to claim 4, wherein said map display displays the search area superimposed on the map.

6. The content display apparatus according to claim 3, wherein said content display controller generates the display list in which the metadata included in only the previous content list is added at the end.

7. The content display apparatus according to claim 6, wherein said content display controller adds information indicating data retrieved in the past to the metadata included in only the previous content list.

8. The content display apparatus according to claim 5, wherein said map display displays the map on which the display symbol indicating newly retrieved data is superimposed for the metadata included in only the latest content list.

9. The content display apparatus according to claim 8, wherein said map display displays the map on which the display symbol indicating data retrieved in the past is superimposed for the metadata included in only the previous content list.

10. The content display apparatus according to claim 8, wherein:
said content display controller is configured to temporarily stop updating of the display list; and
said map display, when updating of the display list is temporarily stopped, stops updating of the display symbol superimposed on the map and periodically displays the location information acquired by said location information acquirer.

11. The content display apparatus according to claim 8 wherein:
said search results display displays content indicated by the resource identifier included in the metadata selected from the display list; and
said map display highlights the display symbol corresponding to the content being displayed in said search results display and the search area, and each time said location information acquirer acquires new location information, updates display of the acquired location information and the search area corresponding thereto.

12. The content display apparatus according to claim 3, wherein said content processor adjusts a size of the search area so that a number of items of the metadata included in the content list becomes a preset number of items.

13. A content display method comprising:
acquiring a collection of metadata including at least content location information indicating a geographical location linked to content and a resource identifier identifying a resource of the content;
periodically acquiring location information indicating a current location;
outputting, as a content list a list of metadata matching a search condition that includes the location information acquired by periodically acquiring from the collection of metadata acquired;
generating a display list in which the content list is formatted for presentation to a user; and
displaying the display list,
wherein, when a latest display list is generated, a latest content list and a previous content list are compared, and the display list is generated arranged so that the metadata included successively in both those content lists has a same display position as in the display list created using the previous content list; and
wherein the generating a display list takes a previously generated display list as a base, and generates the display list in which a display position of the metadata included in only the previous content list is made a blank area and the metadata included in only the latest content list is inserted in the blank area or at the end.

14. The content display method according to claim 13, wherein the generating a display list generates the content list in which information indicating newly retrieved metadata is added to the metadata included in only the latest content list.

15. The content display method according to claim 14, wherein the outputting sets a search area that is a geographical area containing a point indicated by the location information as a search condition, and outputs a list of the metadata included in the search area as the content list.

16. The content display method according to claim 15, further comprising displaying a map which indicates a geographical location indicated by the metadata included in the display list and on which a display symbol linked to the resource identifier is superimposed.

17. The content display method according to claim 16, wherein the displaying a map displays the search area superimposed on the map.

18. The content display method according to claim 15, wherein the generating a display list generates the display list in which the metadata included in only the previous content list is added at the end.

19. The content display method according to claim 18, wherein the generating a display list adds information indicating data retrieved in the past to the metadata included in only the previous content list.

20. The content display method according to claim 17, wherein the displaying a map displays the map on which the display symbol indicating newly retrieved data is superimposed for the metadata included in only the latest content list.

* * * * *